United States Patent
Cho et al.

(10) Patent No.: US 10,904,856 B2
(45) Date of Patent: Jan. 26, 2021

(54) METHOD AND APPARATUS FOR PROVIDING SERVICES IN LOCAL AREA DATA NETWORK

(71) Applicant: Samsung Electronics Co., Ltd., Suwon-si (KR)

(72) Inventors: Chihyun Cho, Suwon-si (KR); Sangjin Kim, Suwon-si (KR); Soohyun Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/429,363

(22) Filed: Jun. 3, 2019

(65) Prior Publication Data
US 2020/0163042 A1    May 21, 2020

(30) Foreign Application Priority Data
Nov. 16, 2018 (KR) .................... 10-2018-0141962

(51) Int. Cl.
*H04W 64/00* (2009.01)
*H04W 48/18* (2009.01)

(52) U.S. Cl.
CPC ......... *H04W 64/006* (2013.01); *H04W 48/18* (2013.01)

(58) Field of Classification Search
CPC ........ H04L 67/18; H04L 67/16; H04W 4/029; H04W 4/025; H04W 4/30; H04W 48/18;
(Continued)

(56) References Cited

U.S. PATENT DOCUMENTS 9,183,504 B2   11/2015   Moore et al.
2004/0203890 A1*   10/2004   Karaoguz ............. H04W 48/16    455/456.1
(Continued)

FOREIGN PATENT DOCUMENTS

WO    2017/100640 A1    6/2017

OTHER PUBLICATIONS

3GPP TS 23.501 V15.3.0, '3GPP; TSG SA; System Architecture for the 5G System; Stage 2 (Release 15)', Aug. 17, 2018.
(Continued)

*Primary Examiner* — Quoc Thai N Vu
(74) *Attorney, Agent, or Firm* — Jefferson IP Law, LLP

(57) ABSTRACT

A method and an apparatus for recommending a service provided by a local area data network (LADN) are provided. The operation method of a mobile edge computing (MEC) control server includes receiving, from at least one of a user equipment (UE), an access and mobility management function (AMF) device, or a session management function (SMF) device, location information including a cell identity (ID) of a cell to which the UE is connected or a tracking area identity (TAI) of a tracking area in which the UE is located, determining at least one LADN accessible by the UE, based on the location information, determining a first service to be recommended to the UE from among services providable to the UE through the at least one LADN, and transmitting, to the UE, information associated with the recommended first service and a LADN capable of providing the recommended first service.

20 Claims, 14 Drawing Sheets

(58) Field of Classification Search
CPC ..... H04W 64/006; H04W 4/02; H04W 60/04; H04W 76/10; G06Q 30/0259; G06Q 30/0261
See application file for complete search history.

(56) References Cited

U.S. PATENT DOCUMENTS

| | | | |
|---|---|---|---|
| 2007/0232323 A1* | 10/2007 | Spriestersbach | G06Q 10/00 455/456.1 |
| 2012/0197709 A1* | 8/2012 | Kendall | G06Q 30/0207 705/14.36 |
| 2014/0297790 A1 | 10/2014 | Song et al. | |
| 2018/0199398 A1* | 7/2018 | Dao | H04W 76/10 |
| 2020/0120752 A1* | 4/2020 | Hu | H04W 76/30 |

OTHER PUBLICATIONS

Samsung, 'A new parameter on AF influence traffic routing request for edge computing support', S2-1810335, SA WG2 Meeting #129, Dongguan, P. R. China, Oct. 8, 2018.
3GPP TS 23.502 V15.3.0, '3GPP; TSG SA; Procedures for the 5G System; Stage 2 (Release 15)', Aug. 17, 2018.
International Search Report dated Sep. 9, 2019, issued in International Patent Application No. PCT/KR2019/006396.

* cited by examiner

METHOD AND APPARATUS FOR PROVIDING SERVICES IN LOCAL AREA DATA NETWORK

CROSS-REFERENCE TO RELATED APPLICATION(S)

This application is based on and claims priority under 35 U.S.C. § 119(a) of a Korean patent application number 10-2018-0141962, filed on Nov. 16, 2018, in the Korean Intellectual Property Office, the disclosure of which is incorporated by reference herein in its entirety.

BACKGROUND

1. Field

The disclosure relates to a method and apparatus for providing services in a local area data network (LADN).

2. Description of Related Art

To meet increasing demands for wireless data traffic after commercialization of $4^{th}$ generation (4G) communication systems, efforts have been made to develop advanced $5^{th}$ generation (5G) or pre-5G communication systems. For this reason, the 5G or pre-5G communication systems are called 'beyond 4G network' communication systems or 'post long term evolution (post-LTE)' systems. 5G communication systems defined by the $3^{rd}$ generation partnership project (3GPP) are called new radio (NR) systems.

The Internet has evolved from a human-based connection network, where humans create and consume information, to the Internet of things (IoT), where distributed elements such as objects exchange information with each other to process the information. Internet of everything (Io E) technology, in which the IoT technology is combined with, for example, technology for processing big data through connection with a cloud server, is being newly provided. To implement new IoT environments, the 5G communication systems are required to meet new service environments such as enhanced mobile broadband (eMBB), massive machine-type communication (MTC), and ultra-reliable and low-latency communication (URLLC) service environments.

The disclosure proposes a new method of providing local services in service environments which are changing as described above.

Other aspects, advantages, and salient features of the disclosure will become apparent to those skilled in the art from the following detailed description, which, taken in conjunction with the annexed drawings, discloses various embodiments of the disclosure.

SUMMARY

Aspects of the disclosure are to address at least the above-mentioned problems and/or disadvantages and to provide at least the advantages described below. Accordingly, an aspect of the disclosure is to provide a method and apparatus for providing services in a local area data network (LADN).

Additional aspects will be set forth in part in the description which follows and, in part, will be apparent from the description, or may be learned by practice of the presented embodiments.

In accordance with an aspect of the disclosure, an operation method of a mobile edge computing (MEC) control server is provided. The operation method includes receiving, from at least one of a user equipment (UE), an access and mobility management function (AMF) device, or a session management function (SMF) device, location information including a cell identity (ID) of a cell to which the UE is connected or a tracking area identity (TAI) of a tracking area in which the UE is located, determining at least one LADN accessible by the UE, based on the location information, determining a first service to be recommended to the UE from among services providable to the UE through the at least one LADN, and transmitting, to the UE, information associated with the recommended first service and a LADN capable of providing the recommended first service.

In another aspect, the method further includes receiving, from the UE, UE information including at least one of a UE ID, a UE Internet protocol (IP) address, UE capability information, or preferred service information, and the determining of the first service to be recommended to the UE may include determining the first service to be recommended based on at least one of the UE information or a UE behavior pattern including at least one of a service usage pattern or a movement pattern of the UE.

In another aspect, the method further includes determining a second service to be recommended based on at least one of the UE information or the UE behavior pattern after the recommended first service is terminated or upon a request of the UE, and transmitting, to the UE, information associated with the recommended second service and a LADN capable of providing the recommended second service.

In another aspect, the recommended first service and the recommended second service are provided through different LADNs.

In another aspect, the operation method further includes updating the UE behavior pattern after the recommended first service is terminated.

In accordance with another aspect of the disclosure, an operation method of a UE is provided. The operation method includes transmitting, to at least one of a MEC control server, an AMF device, or a SMF device, location information including a cell ID of a cell to which the UE is connected or a TAI of a tracking area in which the UE is located, receiving, from the MEC control server, information associated with a recommended first service and a LADN capable of providing the recommended first service, and using the recommended first service by accessing the LADN capable of providing the recommended first service based on the information associated with the LADN.

In another aspect, the method further includes transmitting, to the MEC control server, UE information including at least one of a UE ID, a UE IP address, UE capability information, or preferred service information.

In another aspect, the method further includes receiving, from the MEC control server, information associated with a recommended second service and a LADN capable of providing the recommended second service after the recommended first service is terminated or by transmitting a recommendation request to the MEC control server, and using the recommended second service by accessing the LADN capable of providing the recommended second service based on the information associated with the LADN.

In another aspect, the recommended first service and the recommended second service are provided through different LADNs.

In accordance with another aspect of the disclosure, a MEC control server is provided. The MEC control server includes a transceiver, a memory storing a program and data required for service recommendation, and a processor configured to execute the program stored in the memory to receive, from at least one of a UE, an AMF device, or a SMF device, location information including a cell ID of a cell to which the UE is connected or a TAI of a tracking area in which the UE is located, determine at least one LADN accessible by the UE, based on the location information, determine a first service to be recommended to the UE from among services providable to the UE through the at least one LADN, and transmit, to the UE, information associated with the recommended first service and a LADN capable of providing the recommended first service.

In another aspect, the processor is further configured to receive, from the UE, UE information including at least one of a UE ID, a UE IP address, UE capability information, or preferred service information, and determine the first service to be recommended based on at least one of the UE information or a UE behavior pattern including at least one of a service usage pattern or a movement pattern of the UE.

In another aspect, the processor is further configured to determine a second service to be recommended based on at least one of the UE information or the UE behavior pattern after the recommended first service is terminated or upon a request of the UE, and transmit, to the UE, information associated with the recommended second service and a LADN capable of providing the recommended second service.

In another aspect, the recommended first service and the recommended second service are provided through different LADNs.

In another aspect, the processor is further configured to update the UE behavior pattern after the recommended first service is terminated.

In accordance with another aspect of the disclosure, a UE is provided. The UE includes a transceiver, a memory storing a program and data required for service recommendation, and a processor configured to execute the program stored in the memory to transmit, to at least one of a MEC control server, an AMF, or a SMF, location information including a cell ID of a cell to which the UE is connected or a TAI of a tracking area in which the UE is located, receive, from the MEC control server, information associated with a recommended first service and LADN capable of providing the recommended first service, and use the recommended first service by accessing the LADN capable of providing the recommended first service, based on the information associated with the LADN.

In another aspect, the processor is further configured to transmit, to the MEC control server, UE information including at least one of a UE ID, a UE IP address, UE capability information, or preferred service information In another aspect, the processor is further configured to receive, from the MEC control server, information associated with a recommended second service and a LADN capable of providing the recommended second service after the recommended first service is terminated or by transmitting a recommendation request to the MEC control server, and use the recommended second service by accessing the LADN capable of providing the recommended second service, based on the information associated with the LADN.

In another aspect, the recommended first service and the recommended second service are provided through different LADNs.

According to another embodiment of the disclosure, a computer program product includes a recording medium having recorded thereon a program for executing the operation method of the MEC control server.

According to another embodiment of the disclosure, a computer program product includes a recording medium having recorded thereon a program for executing the operation method of the UE.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
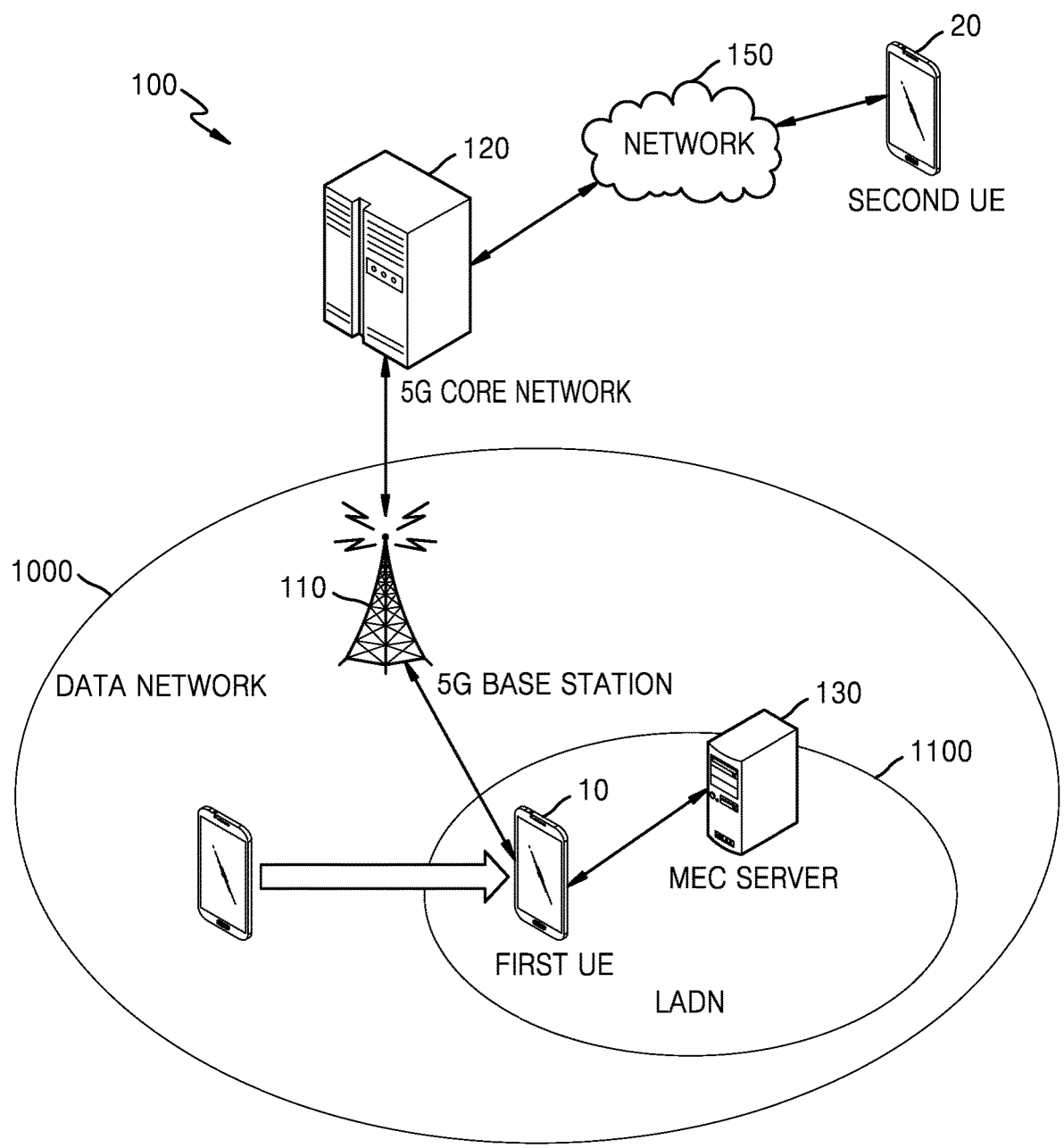
FIG. 1 is a diagram illustrating a mobile communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Some embodiments of the disclosure may be described in terms of functional blocks and various processing operations. Some or all of the functional blocks may be implemented by any number of hardware and/or software elements configured to perform certain functions. For example, the functional blocks of the disclosure may be implemented by one or more microprocessors, or circuit elements for certain functions. As another example, the functional blocks of the disclosure may be implemented using any programming or scripting language. The functional blocks may be implemented using various algorithms executed by one or more processors. Furthermore, the disclosure might employ known technologies for electronic settings, signal processing, and/or data processing.

In addition, connection lines or connection members between elements shown in the drawings illustrate functional connections and/or physical or circuit connections, and connections between elements may be represented by replaceable or additional various functional connections, physical connections, or circuit connections in an actual apparatus.

As used herein, the term "unit" or "module" denotes an entity for performing at least one function or operation and may be implemented as a hardware component, a software component, or a combination of hardware and software components. The "unit" or "module" may be stored in an addressable storage medium or be driven by a program executable by a processor.

For example, the "unit" or "module" may include components (e.g., software components, object-oriented software components, class components, and task components), processes, functions, attributes, procedures, subroutines, segments of program code, drivers, firmware, micro-codes, circuits, data, database, data structures, tables, arrays, and parameters.

In the following description, terms identifying access nodes, terms indicating network entities, terms indicating messages, terms indicating interfaces between network entities, terms indicating various types of identification information, etc. are used merely for convenience of explanation. Therefore, the disclosure is not limited to these terms and other terms having technically equivalent meanings may also be used.

To facilitate explanation, the disclosure uses terms and names defined in the $5^{th}$ generation (5G) or new radio (NR), and long term evolution (LTE) communication standards.

However, the disclosure is not limited to these terms and names and may be equally applied to systems conforming to other standards.

That is, although embodiments of the disclosure will be described mainly based on the communication standards of the $3^{rd}$ generation partnership project (3GPP), it will be understood by one of ordinary skill in the art that the main concept of the disclosure may be slightly modified and applied to other communication systems having similar technical backgrounds without departing from the scope of the disclosure.

FIG. 1 is a diagram illustrating a mobile communication system according to an embodiment of the disclosure.

Referring to FIG. 1, the mobile communication system 100 (e.g., a NR or 5G communication system) may include one or more 5G base stations (e.g., a NR Node B, NR gNB, or NR base station) such as 5G base station 110 and a 5G core network (e.g., a NR core network) device 120. The 5G core network device 120 may include one or more devices associated with functionalities of the 5G core network.

In an exemplary embodiment, mobile edge computing (MEC) may provide various services and caching contents close to a UE (e.g., within a predetermined distance of the UE) by using distributed cloud computing technology in the mobile communication system 100. As such, latency may be reduced, congestion of a core network of the mobile communication system may be reduced based on efficient network operation, and/or local services may be provided near the UE.

MEC may include technology for ultra-reliable and low-latency communication (URLLC) services. For example, to provide URLLC services, the $3^{rd}$ generation partnership project (3GPP) is proceeding with standardization for reducing latency by, for example, defining a transmission time interval (TTI) to be 1 ms or less based on reconfiguration of a radio frame structure, modifying a hybrid automatic repeat request (HARQ) scheme, and improving initial access and scheduling procedures.

A first UE 10 may be an electronic device capable of supporting access to a 5G mobile communication system. In an embodiment of the disclosure, the first UE 10 may include, for example, a smartphone, a tablet, a personal computer (PC), a laptop computer, a home appliance, a medical device, a camera, or a wearable device.

According to an embodiment of the disclosure, the first UE 10 may initially be located in a general data network 1000 and then move into coverage of a local area data network (LADN) 1100. When the first UE 10 is within the coverage of LADN 1100, the first UE 10 may receive services provided by the LADN 1100 by using the 5G mobile communication system 100. The first UE 10 may receive a service specialized for the LADN 1100 and receive a recommendation for a service appropriate for the first UE 10.

A second UE 20 may be an electronic device capable of supporting access to a network. Herein, the network may include the 5G mobile communication system. The second UE 20 may include, for example, a smartphone, a tablet, a PC, a laptop computer, a home appliance, a medical device, a camera, or a wearable device. In an embodiment of the disclosure, the first UE 10 may be connected with the second UE 20 through the 5G base station 110, the 5G core network device 120, and an external network 150.

The 5G base station 110 may be connected to the first UE 10 through a wireless channel and perform scheduling. In an exemplary embodiment, the 5G base station 110 may control a plurality of cells, use orthogonal frequency division multiplexing (OFDM) as a radio access technology (RAT), and use a beamforming technology. The 5G base station 110 may perform adaptive modulation & coding (AMC) for determining a modulation scheme and a channel coding rate according to a channel status of the first UE 10.

The 5G core network device 120 may perform not only a mobility management function but also various control functions for the first UE 10 and be connected to a plurality of base stations. The 5G core network device 120 may include functions such as an AMF and/or a SMF. In an exemplary embodiment, the 5G core network device 120 may perform functions such as mobility support, bearer setup, and/or quality of service (QoS) setup. Furthermore, the 5G core network device 120 may support access to another RAT.

A MEC server 130 may provide, for example, computing resources and storage resources and provide various services to a UE by executing various applications. In an embodiment of the disclosure, the MEC server 130 may be located in the LADN 1100, a network distinguished from the general data network 1000 to provide various services to the first UE 10 located in the coverage of the LADN 1100. The MEC server 130 may provide, for example, food ordering, ticket buying, player cam, video caching, data caching, vehicle-to-everything (V2X), augmented reality (AR), virtual reality (VR), and computer game services. According to an embodiment of the disclosure, the MEC server 130 may be located in the LADN 1100 to provide a service to the first UE 10 located in the same LADN 1100, thereby achieving proximity, circumstances recognition, agility, fast response time, and fast processing speed. Therefore, the MEC server 130 may reduce latency in providing a service and may provide a service specialized for the LADN 1100. In an embodiment of the disclosure, the MEC server 130 may provide a service to the first UE 10 by using the 5G mobile communication system 100.

To provide various services using the MEC technology, an apparatus capable of controlling an overall service providing procedure may be required. In the disclosure, such an apparatus is called a MEC control server. A method and apparatus for providing services in a LADN by using the MEC control server will now be described.

Figure 2:
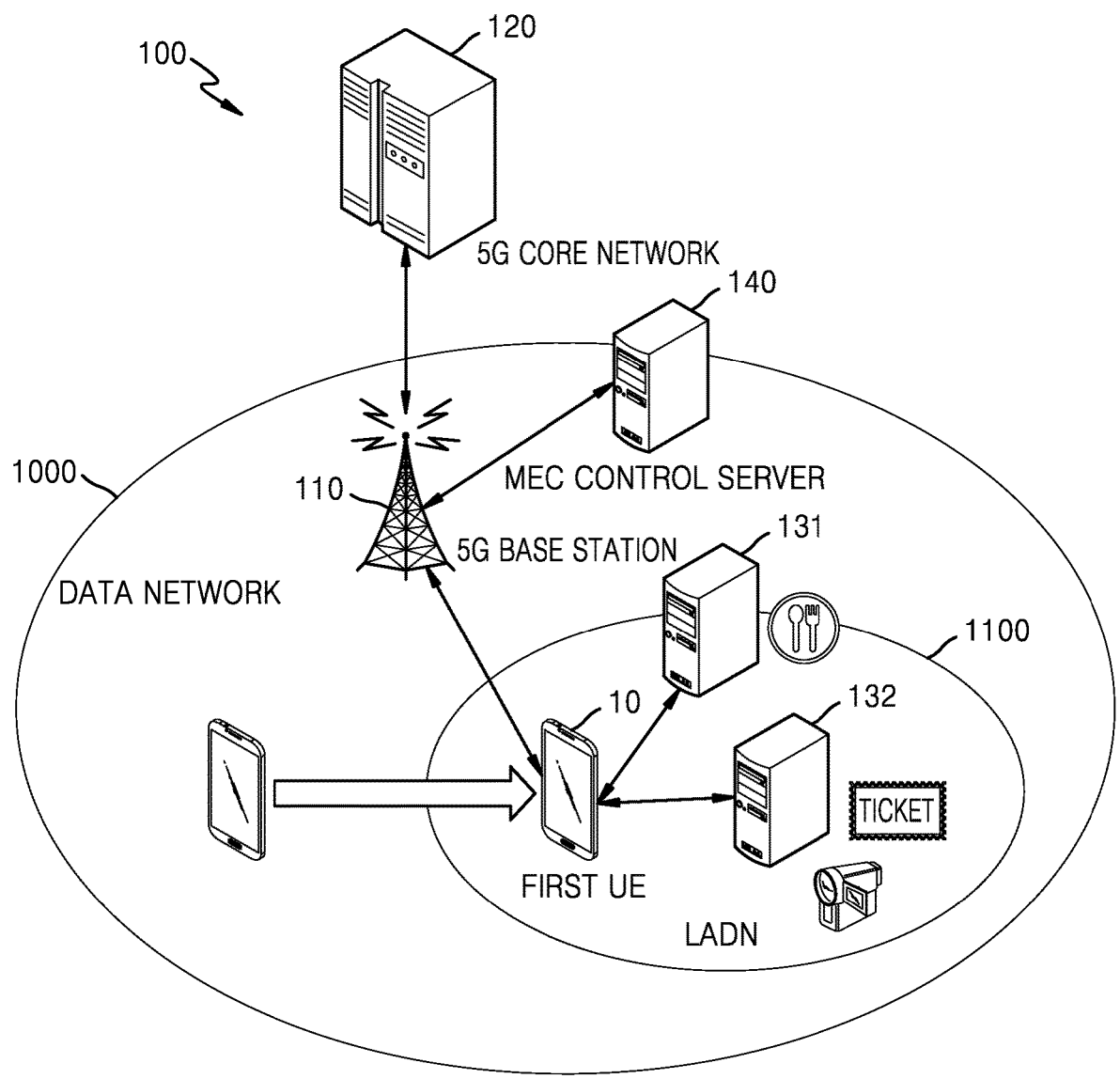
FIG. 2 is a diagram illustrating services provided in a local area data network (LADN) according to an embodiment of the disclosure.

FIG. 2 is a diagram illustrating services provided in a LADN according to an embodiment of the disclosure.

Referring to FIG. 2, the first UE 10 may initially be located in the general data network 1000 and move into coverage of the LADN 1100. When the first UE is within the coverage of LADN 1100, the first UE 10 may be able to receive services through the LADN 1100. In an embodiment of the disclosure, the LADN 1100 may be a data network included in, separate from, or partially included in the general data network 1000. Furthermore, when a 5G mobile communication system supports setup of the LADN 1100, the 5G core network device 120 may set a plurality of neighboring cells as one LADN 1100. Specifically, the 5G core network device 120 may set cell identities (IDs) of a plurality of neighboring cells as configuration information of a specific LADN.

For example, to provide various services at a stadium, cells near the stadium may be set as one LADN 1100. In this case, services specialized for the stadium may be provided using MEC servers 131 and 132 located within the LADN 1100. One or more MEC servers may be located in the LADN 1100. One MEC server may provide one or more services. For example, the MEC server 131 may provide a food ordering service at a food & beverage store in the stadium. For example, the MEC server 132 may provide a ticket buying service and a player cam service in relation to a sport game held at the stadium.

In an embodiment of the disclosure, LADN configuration information including cell IDs of a plurality of cells for configuring the LADN 1100 may be previously provided through the 5G mobile communication system 100 to the first UE 10. In this case, the first UE 10 may determine whether the first UE 10 has entered the coverage of the LADN 1100 based on a change in a connected cell ID or a change in a tracking area identity (TAI). In an embodiment of the disclosure, the 5G core network device 120 may determine whether the first UE 10 has entered the coverage of the LADN 1100 based on a registration request for the first UE 10, which includes a UE ID, the cell ID, and the TAI. Herein, the 5G core network device 120 may refer to a device capable of 5G network functions such as an AMF or a SMF. When the first UE 10 has entered the coverage of the LADN 1100, the first UE 10 or the 5G core network device 120 may transmit, to a MEC control server 140, location information including a cell ID of a cell to which the first UE 10 is connected or a TAI of a tracking area in which the first UE 10 is located.

The MEC control server 140 may control an overall service providing procedure. In an embodiment of the disclosure, the MEC control server 140 may be connected to the 5G base station 110 as illustrated in FIG. 2. However, the disclosure is not limited thereto and the MEC control server 140 may be included in the 5G base station 110, be connected to or included in the 5G core network device 120, or be located outside the LADN 1100 and connected through another network to the 5G core network device 120.

In an embodiment of the disclosure, the MEC control server 140 may receive, from the first UE 10, the 5G core network device 120 (e.g., the AMF or the SMF), the location information including the cell ID of the cell to which the first UE 10 is connected or the TAI of the tracking area in which the first UE 10 is located. The LADN configuration information including the cell IDs of the plurality of cells for configuring the LADN 1100 may be previously provided through the 5G mobile communication system 100 to the MEC control server 140. Therefore, the MEC control server 140 may determine whether the first UE 10 is located in the coverage of the LADN 1100 or whether a LADN accessible by the first UE 10 is present by receiving the location information associated with the first UE 10.

In an embodiment of the disclosure, when the first UE 10 is located in the coverage of the LADN 1100 or when the LADN 1100 accessible by the first UE 10 is present, the MEC control server 140 may check for services in which the MEC servers 131 and 132 located in the LADN 1100 are capable of providing, and determine a service appropriate for and appropriate to recommend to the first UE 10. In this case, the MEC control server 140 may already know of the services capable of being provided by the MEC servers 131 and 132 located in the LADN 1100. In an embodiment of the disclosure, the MEC control server 140 may transmit, to the first UE 10, information associated with the recommended service and a LADN capable of providing the recommended service.

For example, as illustrated in FIG. 2, various services may be provided at a stadium such that cells near the stadium may be set as one LADN 1100. The MEC server 131 may provide a food ordering service at a food & beverage store in the stadium, and the MEC server 132 may provide a ticket buying service and a player cam service in relation to a sport game held at the stadium. In this case, when the first UE 10 has entered the coverage of the LADN 1100 at lunch time, the MEC control server 140 may recommend the food ordering service of the MEC server 131 to the first UE 10. When the first UE 10 has initially entered the coverage of the LADN 1100, the MEC control server 140 may recommend the ticket buying service of the sport game held at the stadium. When the first UE 10 continuously stays in the coverage of the LADN 1100 during the sport game, the MEC control server 140 may provide the player cam service at key moments of the sport game.

The procedure, performed by the MEC control server 140, determining a service appropriate for and to be recommended to the first UE 10 will be described in detail below.

According to an embodiment of the disclosure, a service specialized for the LADN 1100 in which a UE is located may be provided, or a service appropriate for the UE may be recommended. Furthermore, when transmission of a large amount of data is required as in a video-related service such as a player cam service, a MEC server located adjacent to the UE may provide the service such that latency may be reduced and burden on a core network of a mobile communication system may be reduced.

Figure 3:
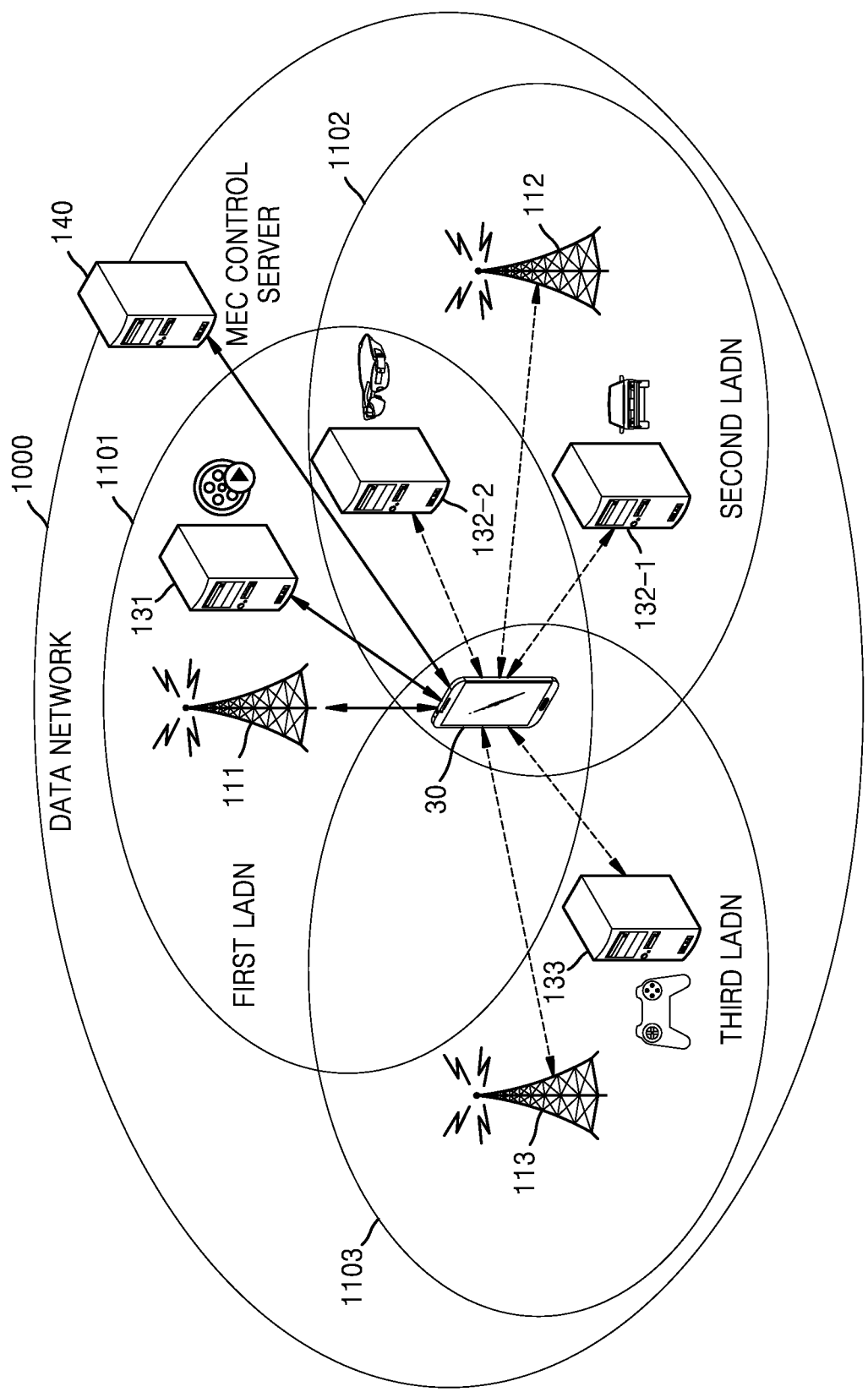
FIG. 3 is a diagram illustrating services provided in a LADN according to another embodiment of the disclosure.

FIG. 3 is a diagram illustrating services provided in a LADN according to an embodiment of the disclosure.

A procedure, performed by a UE, for receiving services from one or more MEC servers in one LADN has been described in relation to FIG. 2. A procedure, performed by a UE, of receiving services from one of a plurality of LADNs when the UE is capable of accessing a plurality of LADNs will now be described with reference to FIG. 3.

Referring to FIG. 3, a general data network 1000 may include a plurality of LADNs 1101, 1102, and 1103 that may be set and accessible through different base stations 111, 112, and 113. A UE 30 may be located in a position such that the UE 30 is within coverages of all three different LADNs 1101, 1102, and 1103. As illustrated in FIG. 3, when the LADNs 1101, 1102, and 1103 are respectively set to be connectable through the different base stations 111, 112, and 113, the UE 30 may be capable of connecting to only one base station and thus may receive a service from one LADN at a time. However, the disclosure is not limited thereto and, when the UE 30 is connectable through one base station to a plurality of LADNs, the UE 30 may receive services through the base station from different LADNs at the same time.

A procedure, performed by the MEC control server 140, of identifying services in which the MEC servers 131 and 132 located in the LADN 1100 are capable of providing, from among services providable to the first UE 10 in one LADN, and of determining a service appropriate for and to be recommended to the first UE 10 has been described above in relation to FIG. 2. When the plurality of LADNs 1101, 1102, and 1103 are accessible by a UE as illustrated in FIG. 3, the MEC control server 140 may identify services in which MEC servers 131, 132-1, 132-2, and 133 located in the LADNs 1101, 1102, and 1103 are capable of providing, and determine a service appropriate for and to be recommended to the UE 30. In this case, the MEC control server 140 may already know of the services providable by the MEC servers 131, 132-1, 132-2, and 133 located in the LADNs 1101, 1102, and 1103. In an embodiment of the disclosure, the MEC control server 140 may transmit, to the UE 30, information associated with the recommended service and a LADN capable of providing the recommended service.

For example, the MEC server 131 located in the LADN 1101 may provide a video caching service, the MEC servers 132-1 and 132-2 located in the LADN 1102 may provide AR, VR, and V2X services, and the MEC server 133 located in the LADN 1103 may provide a computer game service. In this case, the MEC control server 140 may determine a service appropriate for and to be recommended to the UE 30 and transmit, to the UE 30, information associated with the recommended service and a LADN capable of providing the recommended service. For example, when the UE 30 is moving toward the LADN 1103, the MEC control server 140 may recommend the computer game service providable by the MEC server 133 located in the LADN 1103. When the UE 30 is displaying a high-resolution video such as a movie, the MEC control server 140 may recommend the video caching service providable by the MEC server 131 located in the LADN 1101. Furthermore, when the UE 30 frequently executes an AR or VR application, the MEC control server 140 may recommend the AR or VR service providable by the MEC server 132-2 located in the LADN 1102.

In an embodiment of the disclosure, the MEC control server 140 may determine a second service to be recommended, when the UE 30 terminates use of a recommended first service or when a request of the UE 30 is received while the UE 30 is using the recommended first service. In this case, the MEC control server 140 may transmit, to the UE 30, information associated with the recommended second service and a LADN capable of providing the recommended second service. In an embodiment of the disclosure, the recommended first service and the recommended second service may be services provided by MEC servers located in different LADNs.

Although the above description related to FIG. 3 assumes that a UE is included in coverages of three different LADNs, the disclosure is not limited thereto and the UE may be included in coverages of a plurality of different LADNs to receive a service therefrom. For example, the UE may receive a service from one of two different LADNs or from one of five different LADNs.

Figure 4:
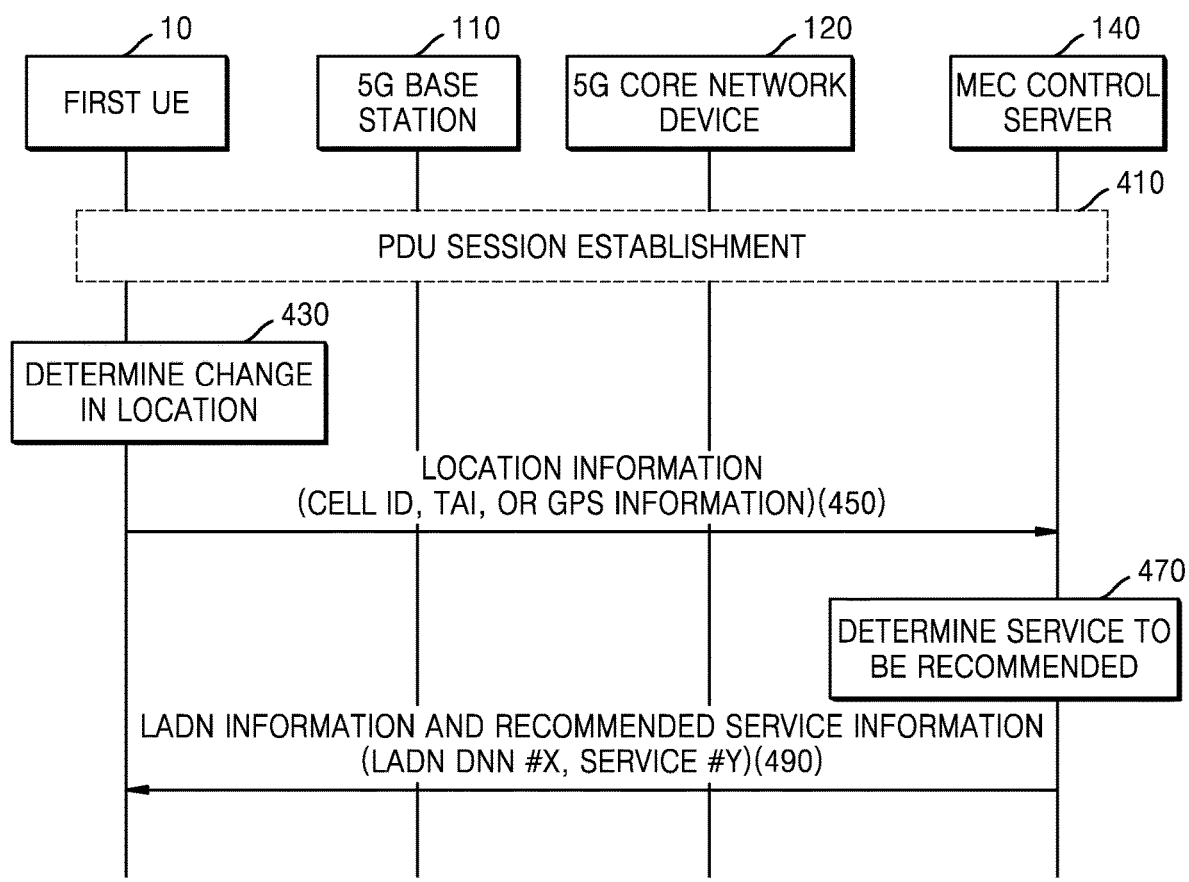
FIG. 4 is a signal diagram of a method of providing services in a LADN according to an embodiment of the disclosure.

FIG. 4 is a signal diagram of a method of providing services in a LADN according to an embodiment of the disclosure.

Referring to FIG. 4, initially, in operation 410, one protocol data unit (PDU) session may be established between the first UE 10, the 5G base station 110, the 5G core network device 120 corresponding to a 5G core network function such as an AMF or SMF, and the MEC control server 140.

In operation 430, the first UE 10 may determine that a location thereof is changed. In an embodiment of the disclosure, the first UE 10 may determine whether the first UE 10 has entered coverage of the LADN based on a change in a connected cell ID or a change in a TAI. LADN configuration information including cell IDs of a plurality of cells for configuring the LADN may be previously provided through a 5G mobile communication system to the first UE 10. Alternatively, the first UE 10 may determine whether the first UE 10 has entered the coverage of the LADN based on global positioning system (GPS) information. In this case, a cell ID of each cell and GPS information of the cell may be previously provided to the first UE 10, and the first UE 10 may determine whether the first UE 10 is located in a specific cell based on the GPS information, and thus determine whether the first UE 10 has entered the coverage of the LADN.

In operation 450, when the first UE 10 has entered the coverage of the LADN, the first UE 10 may transmit, to the MEC control server 140, location information including a cell ID of a cell to which the first UE 10 is connected or a TAI of a tracking area in which the first UE 10 is located. In an embodiment of the disclosure, the location information may further include, for example, a UE ID and a UE IP address.

In operation 470, the MEC control server 140 may determine at least one LADN accessible by the first UE 10 based on the location information. In an embodiment of the disclosure, the MEC control server 140 having received the location information of the first UE 10 may determine whether the first UE 10 has entered the coverage of the LADN based on the cell ID or the TAI. The LADN configuration information including the cell IDs of the plurality of cells for configuring the LADN may be previously provided through the 5G mobile communication system to the MEC control server 140. Therefore, the MEC control server 140 may determine whether a LADN accessible by the first UE 10 is present, based on the cell ID or the TAI. The MEC control server 140 may already know of services providable by the MEC servers 131 and 132 located in the LADN. In an embodiment of the disclosure, the MEC control server 140 may determine a first service to be recommended, considering UE information of the first UE 10, a UE behavior pattern of the first UE 10, etc. Herein, the UE information may include, for example, the UE ID, the UE IP address, UE capability information, and preferred service information. The UE behavior pattern may include, for example, a service usage pattern and a movement pattern of the first UE 10.

In operation 490, the MEC control server 140 may transmit, to the first UE 10, information associated with the recommended first service and a LADN capable of providing the recommended first service. In an embodiment of the disclosure, the MEC control server 140 may transmit a data network name (DNN) of the LADN (e.g., LADN DNN #X) and a service number (e.g., Service #Y) to the first UE 10.

According to an embodiment of the disclosure, the MEC server 130 may be located in the LADN to provide a service to the first UE 10 located in the same LADN, thereby achieving proximity, circumstances recognition, agility, fast response time, and fast processing speed. Therefore, the MEC server 130 may reduce latency in providing a service and may provide a service specialized for the LADN.

Figure 5:
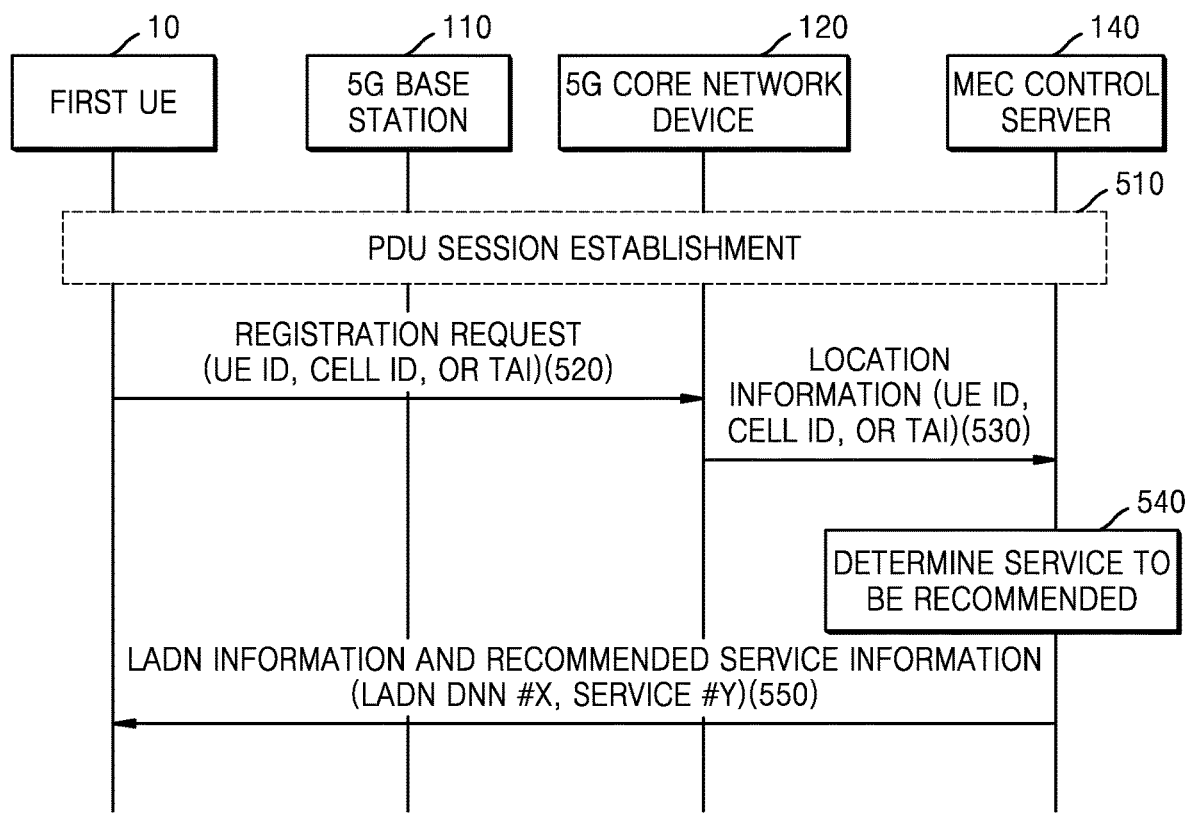
FIG. 5 is a signal diagram of a method of providing services in a LADN according to another embodiment of the disclosure.

FIG. 5 is a signal diagram of a method of providing services in a LADN according to an embodiment of the disclosure.

Referring to FIG. 5, initially, in operation 510, one PDU session may be established between the first UE 10, the 5G base station 110, the 5G core network device 120 corresponding to a 5G core network function such as AMF or SMF, and the MEC control server 140.

In operation 520, the 5G core network device 120 may receive, from the first UE 10, a registration request including a cell ID of a cell to which the first UE 10 is connected or a TAI of a tracking area in which the first UE 10 is located. In an embodiment of the disclosure, the 5G core network device 120 may further receive a UE ID. When the first UE 10 moves, a handover or cell reselection may occur depending on a connection status to a base station. When handover or cell reselection has occurred, the 5G core network device 120 may check a location of the first UE 10 by receiving, from the first UE 10, the registration request including the cell ID or the TAI. In an embodiment of the disclosure, the 5G core network device 120 may determine whether the first UE 10 has entered coverage of the LADN based on the cell ID of the cell to which the first UE 10 is connected or the TAI of the tracking area in which the first UE 10 is located. LADN configuration information including cell IDs of a plurality of cells for configuring the LADN may be previously stored through a 5G mobile communication system in the 5G core network device 120 corresponding to a 5G core network function.

In operation 530, when the first UE 10 has entered the coverage of the LADN, the 5G core network device 120 may transmit, to the MEC control server 140, location information including the cell ID of the cell to which the first UE 10 is connected or the TAI of the tracking area in which the first UE 10 is located. In an embodiment of the disclosure, the location information may further include, for example, a UE ID.

In operation 540, the MEC control server 140 may determine at least one LADN accessible by the first UE 10, based on the location information. In an embodiment of the disclosure, the MEC control server 140 having received the location information of the first UE 10 may determine whether the first UE 10 has entered the coverage of the LADN, based on the cell ID or the TAI. The LADN configuration information including the cell IDs of the plurality of cells for configuring the LADN may be previously provided through the 5G mobile communication system to the MEC control server 140. Therefore, the MEC control server 140 may determine whether a LADN accessible by the first UE 10 is present based on the cell ID or the TAI. The MEC control server 140 may already know of services capable of being provided by the MEC servers 131 and 132 located in the LADN. In an embodiment of the disclosure, the MEC control server 140 may determine a first service to be recommended, considering UE information of the first UE 10, a UE behavior pattern of the first UE 10, etc. Herein, the UE information may include, for example, a UE ID, a UE IP address, UE capability information, and preferred service information. The UE behavior pattern may include, for example, a service usage pattern and a movement pattern of a UE.

In operation 550, the MEC control server 140 may transmit, to the first UE 10, information associated with the recommended first service and a LADN capable of providing the recommended first service. In an embodiment of the disclosure, the MEC control server 140 may transmit a DNN of the LADN (e.g., LADN DNN #X) and a service number (e.g., Service #Y) to the first UE 10.

According to an embodiment of the disclosure, the MEC server 130 may be located in the LADN to provide a service to the first UE 10 located in the same LADN, thereby achieving proximity, circumstances recognition, agility, fast response time, and fast processing speed. Therefore, the MEC server 130 may reduce latency in providing a service and may provide a service specialized for the LADN.

Figure 6:
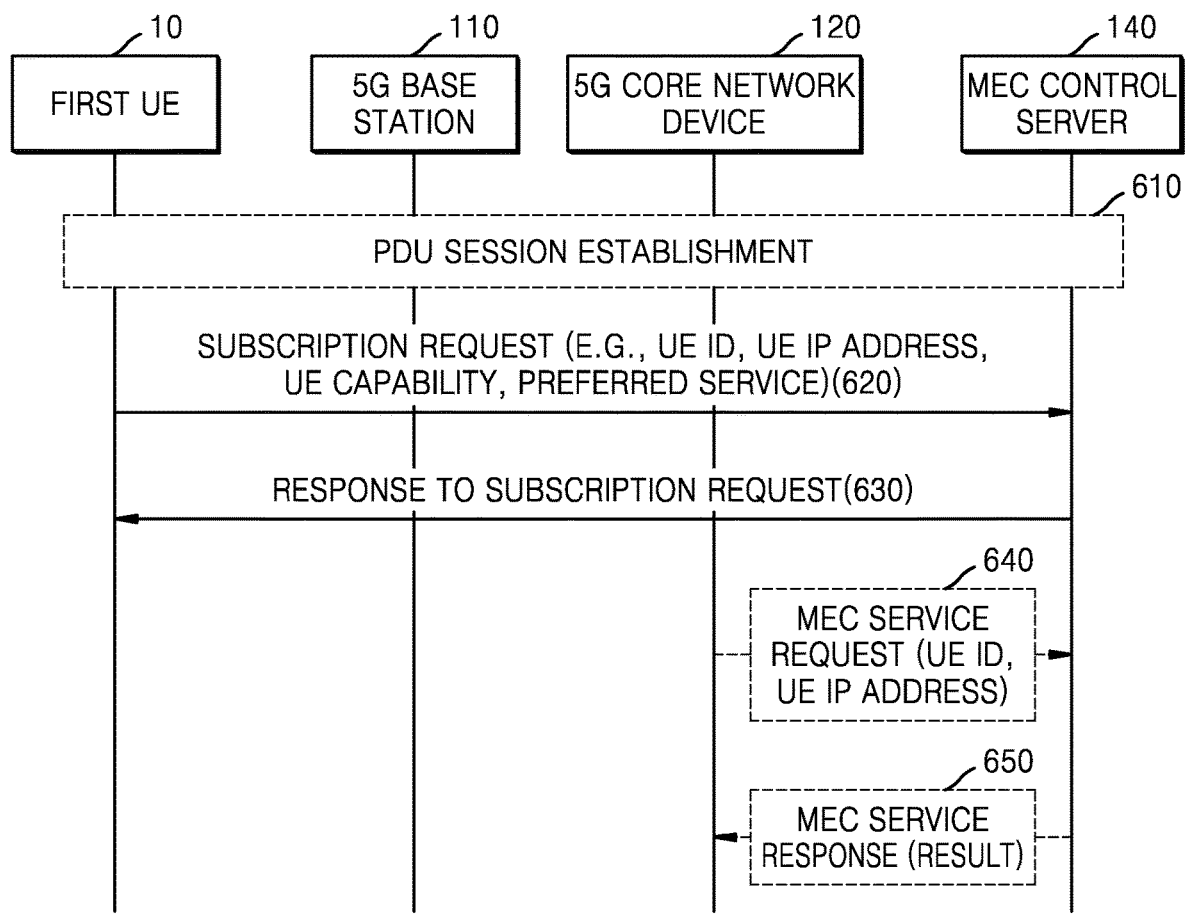
FIG. 6 is a signal diagram of a method of providing user equipment (UE) information according to an embodiment of the disclosure.

FIG. 6 is a signal diagram of a method of providing UE information, according to an embodiment of the disclosure.

Referring to FIG. 6, as a preliminary procedure for providing services in a LADN, a user subscription procedure for providing UE information is illustrated.

Initially, in operation 610, one PDU session may be established between the first UE 10, the 5G base station 110, the 5G core network device 120 corresponding to a 5G core network function such as AMF or SMF, and the MEC control server 140.

In operation 620, the first UE 10 may transmit a subscription request to the MEC control server 140 to receive a recommendation for a service. In an embodiment of the disclosure, the subscription request may include UE information including, for example, a UE ID, a UE IP address, UE capability information, and preferred service information. According to an embodiment of the disclosure, the first UE 10 may receive a recommendation for a service appropriate for the first UE 10 by transmitting the UE information to the MEC control server 140. For example, the first UE 10 may receive a recommendation for a video caching service for a video of a resolution supported by the first UE 10, or a recommendation for a computer game service executable based on specifications of the first UE 10.

In operation 630, the MEC control server 140 may transmit, to the first UE 10, a response to the subscription request. In an embodiment of the disclosure, when the MEC control server 140 determines to recommend a service to the first UE 10, the MEC control server 140 may transmit a subscription acknowledgement (ACK) message. When the MEC control server 140 determines not to recommend a service to the first UE 10, the MEC control server 140 may transmit a subscription negative-acknowledgement (NACK) message.

Operations 640 and 650 correspond to a procedure in which the 5G core network device 120 other than the first UE 10 may transmit a service recommendation request to the first UE 10, and receive a response to the service recommendation request. Therefore, the procedure of operations 640 and 650 may correspond to operations 620 and 630, and may be performed separately from operations 620 and 630.

In operation 640, the 5G core network device 120 may transmit a MEC service request to the MEC control server 140 to recommend a service to the first UE 10. In an embodiment of the disclosure, the MEC service request may include the UE information including, for example, the UE ID and the UE IP address. According to an embodiment of the disclosure, the first UE 10 may receive a recommendation for a service appropriate for the first UE 10 by transmitting the UE information to the MEC control server 140. For example, the first UE 10 may receive a recommendation for a V2X service based on a location of the first UE 10.

In operation 650, the MEC control server 140 may transmit, to the 5G core network device 120, a response to the MEC service request. In an embodiment of the disclosure, when the MEC control server 140 determines to recommend a service to the first UE 10, the MEC control server 140 may transmit an ACK message. When the MEC control server 140 determines not to recommend a service to the first UE 10, the MEC control server 140 may transmit a NACK message.

Figure 7:
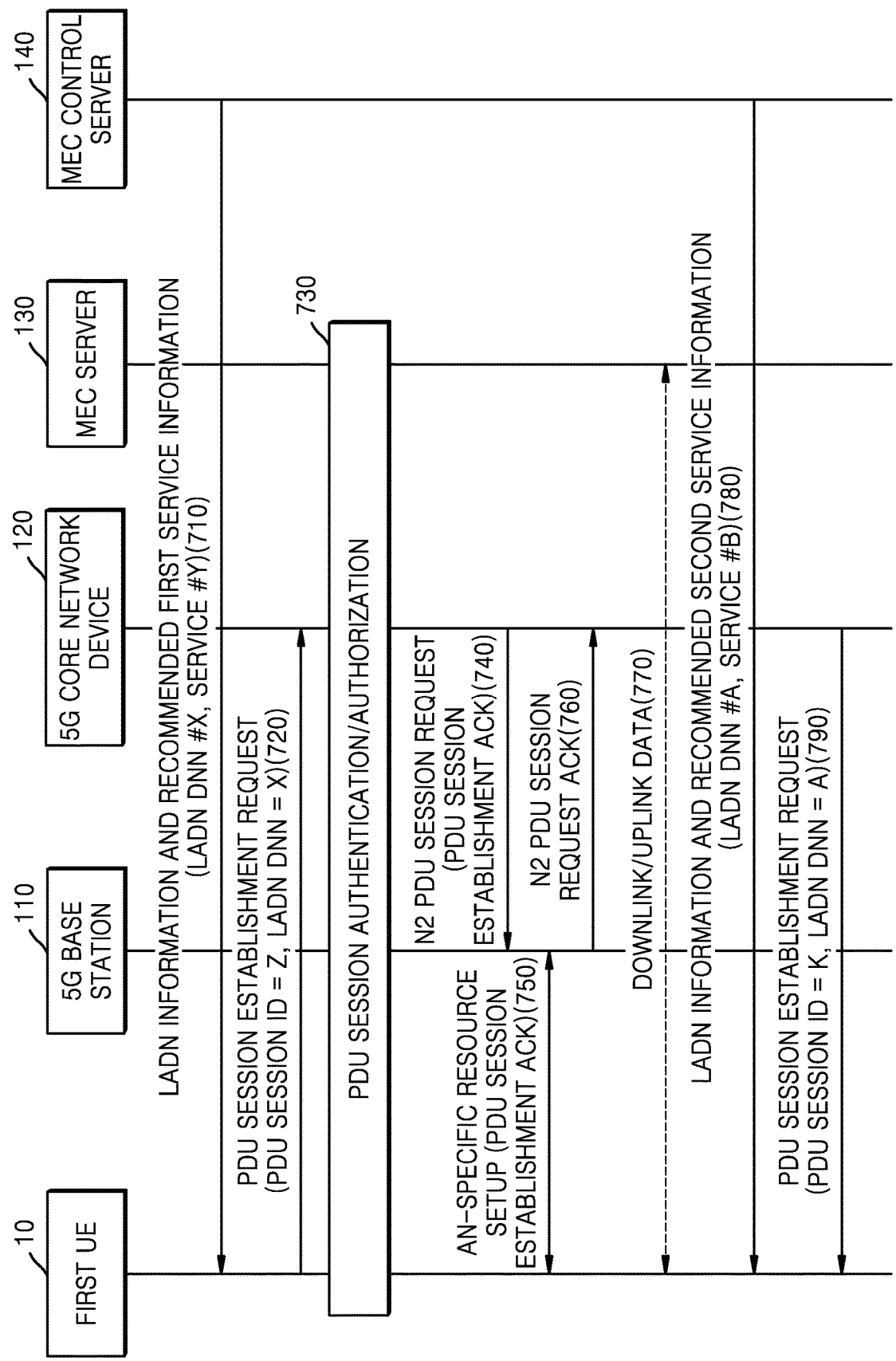
FIG. 7 is a signal diagram of a method of using a recommended service according to an embodiment of the disclosure.

FIG. 7 is a signal diagram of a method of using a recommended service, according to an embodiment of the disclosure.

Referring to FIG. 7, a procedure in which the MEC control server 140 recommends a service to the first UE 10 and the first UE 10 accesses the MEC server 130 located in a LADN, to use the service is illustrated.

In operation 710, the MEC control server 140 may transmit, to the first UE 10, information associated with a recommended first service and a LADN capable of providing the recommended first service. In an embodiment of the disclosure, the MEC control server 140 may transmit a DNN of the LADN (e.g., LADN DNN #X) and a service number (e.g., Service #Y) to the first UE 10.

In operation 720, the first UE 10 may transmit a PDU session establishment request to the 5G core network device 120 based on the information associated with the LADN capable of providing the recommended first service, which is received from the MEC control server 140. In an embodiment of the disclosure, the PDU session establishment request may include a PDU session ID (e.g., PDU Session ID=Z) and a DNN of the LADN (e.g., LADN DNN=X).

In operation 730, the first UE 10, the 5G base station 110, the 5G core network device 120 corresponding to a 5G core network function, and the MEC server 130 may perform PDU session authentication/authorization.

When the PDU session authentication/authorization is normally performed, the 5G core network device 120 may transmit an N2 PDU session request to the 5G base station 110 in operation 740, access network (AN)-specific resource setup may be performed between the 5G base station 110 and the first UE 10 in operation 750, and the 5G base station 110 may transmit an N2 PDU session request ACK to the 5G core network device 120 in operation 760.

In operation 770, the recommended first service may be provided and used between the first UE 10 and the MEC server 130 through reception of downlink data and transmission of uplink data.

Thereafter, in operation 780, when the first UE 10 terminates use of the recommended first service or when a request of the first UE 10 is received while the first UE 10 is using the recommended first service, the MEC control server 140 may determine a second service to be recommended and provide, to the first UE 10, information associated with the recommended second service and a LADN capable of providing the recommended second service. In an embodiment of the disclosure, the MEC control server 140 may transmit a DNN of the LADN (e.g., LADN DNN #A) and a service number (e.g., Service #B) to the first UE 10.

In operation 790, the first UE 10 may transmit a PDU session establishment request to the 5G core network device 120 based on the information associated with the LADN capable of providing the recommended second service, which is received from the MEC control server 140. In an embodiment of the disclosure, the PDU session establishment request may include a PDU session ID (e.g., PDU Session ID=K) and a DNN of the LADN (e.g., LADN DNN=A).

Thereafter, operations 730 to 770 may be repeatedly performed.

Figure 8:
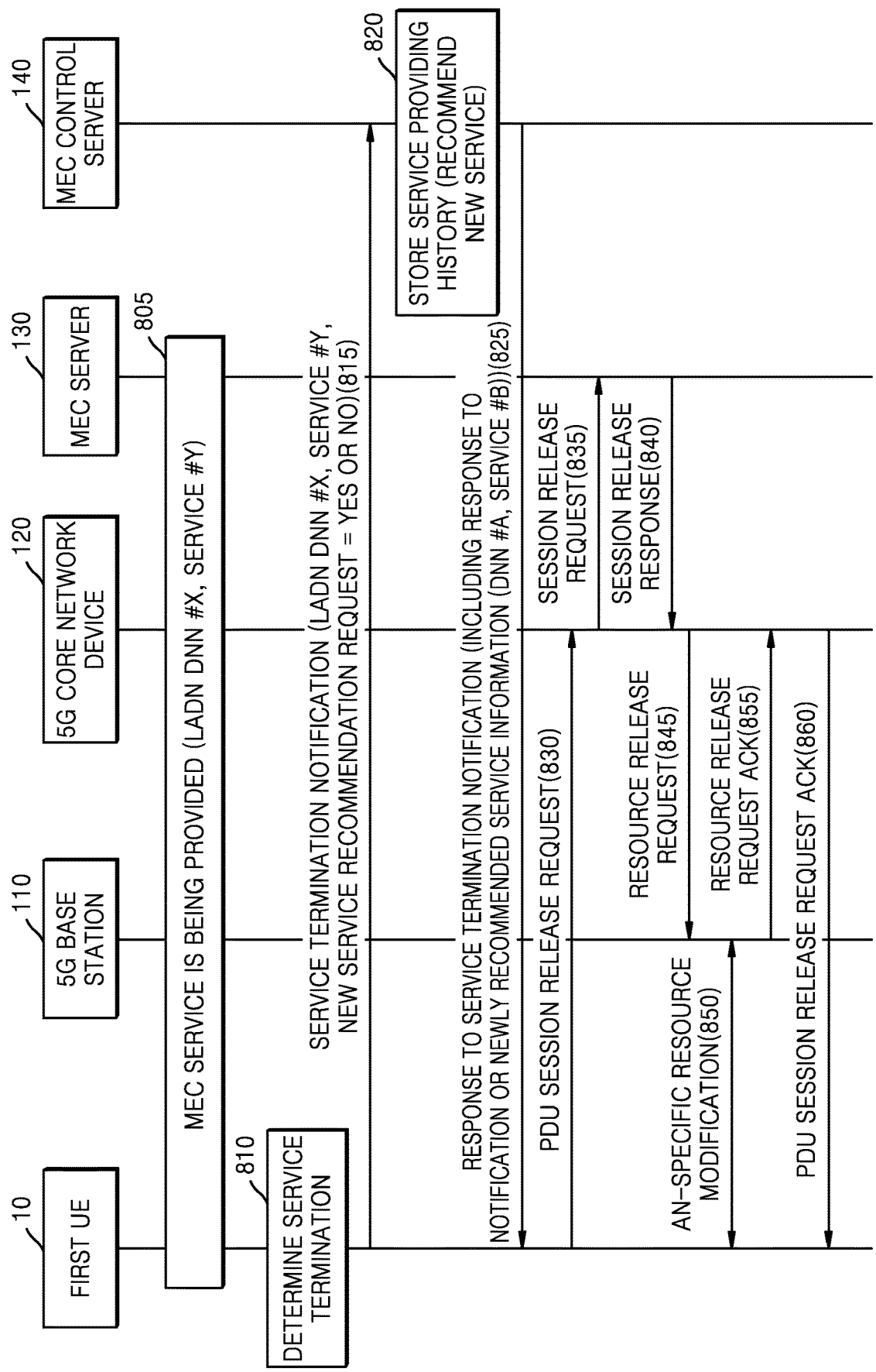
FIG. 8 is a signal diagram of a method of terminating a recommended service according to an embodiment of the disclosure.

FIG. 8 is a signal diagram of a method of terminating a recommended service, according to an embodiment of the disclosure.

Referring to FIG. 8, initially, in operation 805, a recommended first service may be provided and used between the first UE 10 and the MEC server 130 through the 5G base station 110 and the 5G core network device 120 corresponding to a 5G core network function such as AMF or SMF.

In operation 810, the first UE 10 may determine that the recommended first service is terminated. In an embodiment of the disclosure, when an application executed to use the recommended first service is terminated or when a session established to use the recommended first service is terminated, the first UE 10 may determine that the recommended first service is terminated.

In operation 815, the first UE 10 may transmit, to the MEC control server 140, information associated with the terminated recommended first service and an LADN capable of providing the recommended first service, thereby notifying that the recommended first service is terminated. Specifically, the first UE 10 may transmit a DNN of the LADN (e.g., LADN DNN #X) and a service number (e.g., Service #Y) to the MEC control server 140. In an embodiment of the disclosure, the first UE 10 may additionally transmit a new service recommendation request. The new service recommendation request may be transmitted using a 1-bit indicator instructing whether to request a recommendation.

In operation 820, the MEC control server 140 may store a service providing history indicating that the recommended first service has been provided to the first UE 10. When the new service recommendation request is received from the first UE 10, the MEC control server 140 may determine a second service to be recommended to the first UE 10.

In operation 825, the MEC control server 140 may transmit, to the first UE 10, a response to the recommended first service termination notification. In this case, the MEC control server 140 may transmit, to the first UE 10, information associated with the recommended second service and a LADN capable of providing the recommended second service. In an embodiment of the disclosure, the MEC control server 140 may transmit a DNN of the LADN (e.g., LADN DNN #A) and a service number (e.g., Service #B) to the first UE 10.

The first UE 10 having received the response to the recommended first service termination notification may transmit a PDU session release request to the 5G core network device 120 in operation 830, and the 5G core network device 120 having received the PDU session release request may transmit a session release request to the MEC server 130 connected to the first UE 10, in operation 835. Then, the MEC server 130 may transmit a session release response to the 5G core network device 120 in operation 840, and the 5G core network device 120 having received the session release response may transmit a resource release request to the 5G base station 110 in operation 845. Thereafter, AN-specific resource modification may be performed between the 5G base station 110 and the first UE 10 in operation 850, the 5G base station 110 may transmit a resource release request ACK to the 5G core network device 120 in operation 855, and the 5G core network device 120 having received the resource release request ACK may transmit a PDU session release request ACK to the first UE 10 in operation 860.

Figure 9:
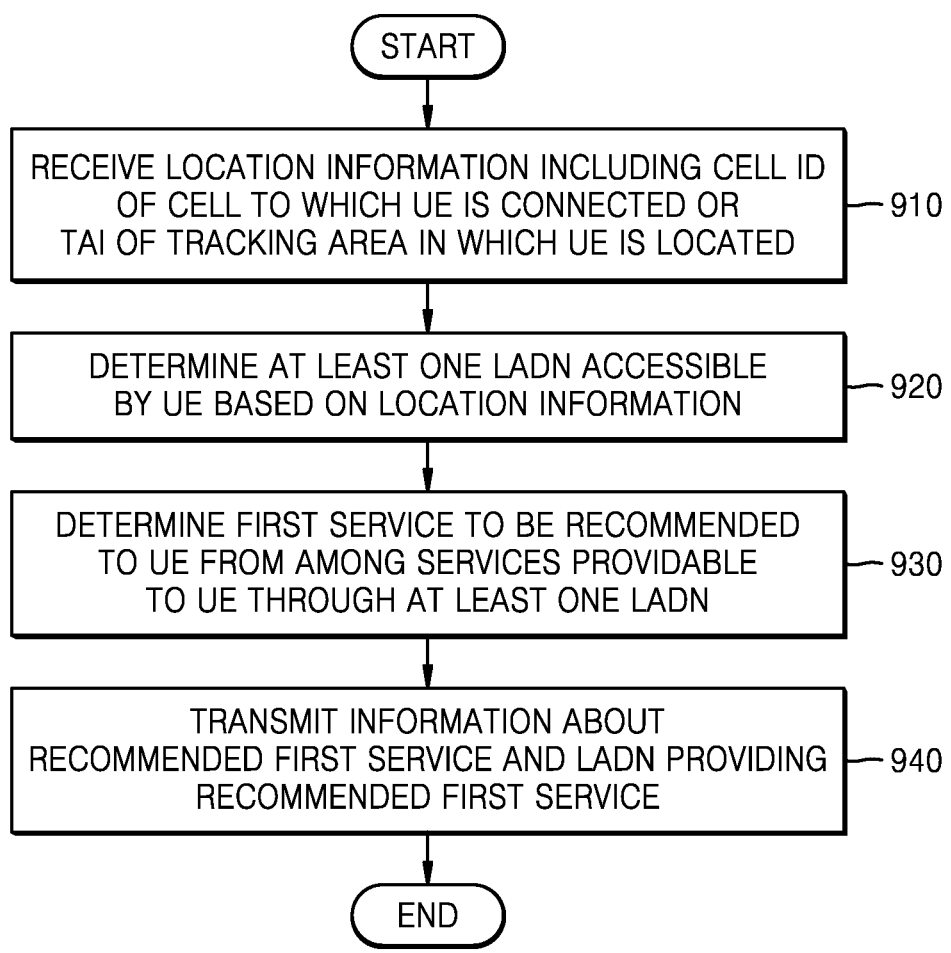
FIG. 9 is a flowchart of an operation method of a mobile edge computing (MEC) control server according to an embodiment of the disclosure.

FIG. 9 is a flowchart of an operation method of a MEC control server according to an embodiment of the disclosure.

In operation 910, the MEC control server may receive, from at least one of a UE, a 5G core network device such as an AMF, or a SMF, location information including a cell ID of a cell to which the UE is connected or a TAI of a tracking area in which the UE is located. In an embodiment of the disclosure, the MEC control server may further receive, from the UE, UE information including, for example, a UE ID, a UE IP address, UE capability information, and preferred service information. The UE information may be received before the location information is received, together with the location information, or after the location information is received.

Thereafter, in operation 920, the MEC control server may determine at least one LADN accessible by the UE based on the location information. In an embodiment of the disclosure, LADN configuration information including cell IDs of a plurality of cells for configuring the LADN may be previously provided through a 5G mobile communication system to the MEC control server. Therefore, the MEC control server may determine whether the UE is located in coverage of the LADN or whether a LADN accessible by the UE is present by receiving the location information of the UE.

According to an embodiment of the disclosure, by providing a service from a LADN adjacent to the UE, a service specialized for the LADN in which the UE is located may be provided and proximity, circumstances recognition, agility, fast response time, and fast processing speed may be achieved.

Then, in operation 930, the MEC control server may determine a first service to be recommended to the UE from among services providable to the UE through the at least one LADN. In an embodiment of the disclosure, the MEC control server may determine the first service to be recommended based on at least one of UE information or a UE behavior pattern including at least one of a service usage pattern or a movement pattern of the UE.

According to an embodiment of the disclosure, the MEC control server may recommend a service appropriate for the UE.

Thereafter, in operation 940, the MEC control server may transmit, to the UE, information associated with the recommended first service and the LADN capable of providing the recommended first service. In an embodiment of the disclosure, the MEC control server may transmit a DNN of the LADN and a service number to the UE.

Furthermore, the MEC control server may determine a second service to be recommended, when the UE terminates use of the recommended first service or when a request of the UE is received while the UE is using the recommended first service, and transmit, to the UE, information associated with the recommended second service and a LADN capable of providing the recommended second service. In an embodiment of the disclosure, the recommended first service and the recommended second service may be services provided by MEC servers located in different LADNs. The MEC servers may update the UE behavior pattern after the recommended first service is terminated. According to an embodiment of the disclosure, the MEC servers may obtain a more accurate database by continuously updating the UE behavior pattern, and thus recommend a service more appropriate for the UE.

Figure 10:
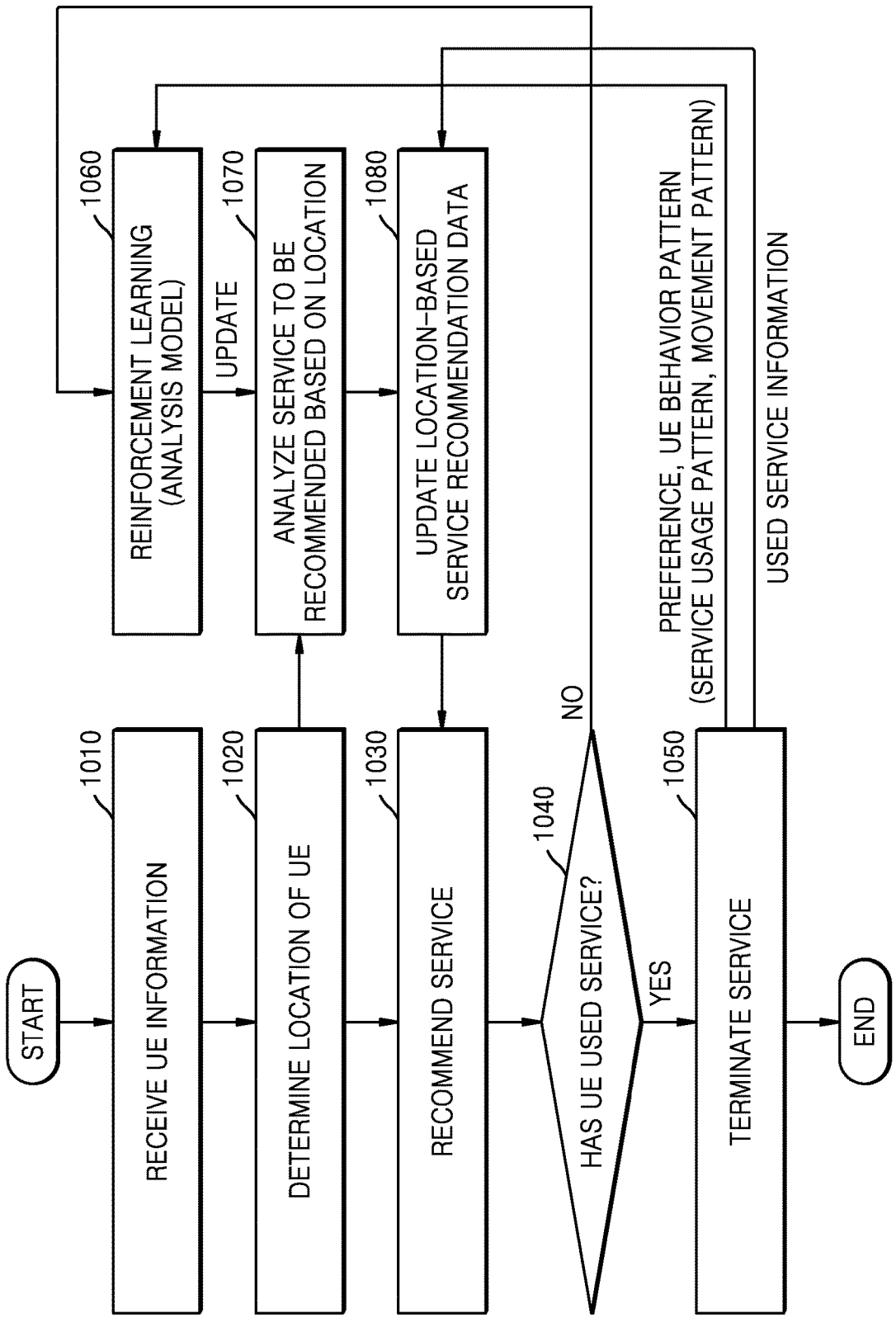
FIG. 10 is a flowchart of a method, of determining a service to be recommended performed by a MEC control server according to an embodiment of the disclosure.

FIG. 10 is a flowchart of a method of determining a service to be recommended performed by a MEC control server according to an embodiment of the disclosure.

In operation 1010, the MEC control server may receive UE information. In an embodiment of the disclosure, the MEC control server may receive, from a UE, the UE information including, for example, a UE ID, a UE IP address, UE capability information, and preferred service information.

Then, in operation 1020, the MEC control server may determine a location of the UE. In an embodiment of the disclosure, the MEC control server may determine the location of the UE by receiving, from at least one of the UE, a 5G core network device such as an AMF, or a SMF, location information including a cell ID of a cell to which the UE is connected or a TAI of a tracking area in which the UE is located. The MEC control server may analyze a service to be recommended based on the location of the UE by using an analysis model, in operation 1070, update location-based service recommendation data indicating services recommended to a specific UE at a specific location, in operation 1080, and recommend a service appropriate for the UE, in operation 1030.

Thereafter, in operation 1040, the MEC control server may determine whether the UE has used the recommended service. In an embodiment of the disclosure, the MEC control server may determine whether the UE has used the recommended service, by communicating with a MEC server providing the recommended service. Upon determining that the UE has used the recommended service in operation 1040, the MEC control server may proceed to operation 1050 to determine whether the recommended service is terminated. Subsequently, the MEC control server may proceed to operation 1060 to perform learning to reinforce the analysis model based on a recommended service usage history (e.g., preference and a behavior pattern (e.g., a service usage pattern and a movement pattern) of the UE). The reinforced analysis model may be updated and used for a subsequent location-based service recommendation analysis. The MEC control server may additionally or alternatively proceed to operation 1080 and update the location-based service recommendation data by reflecting the fact that the UE has used the recommended service.

Figure 11:
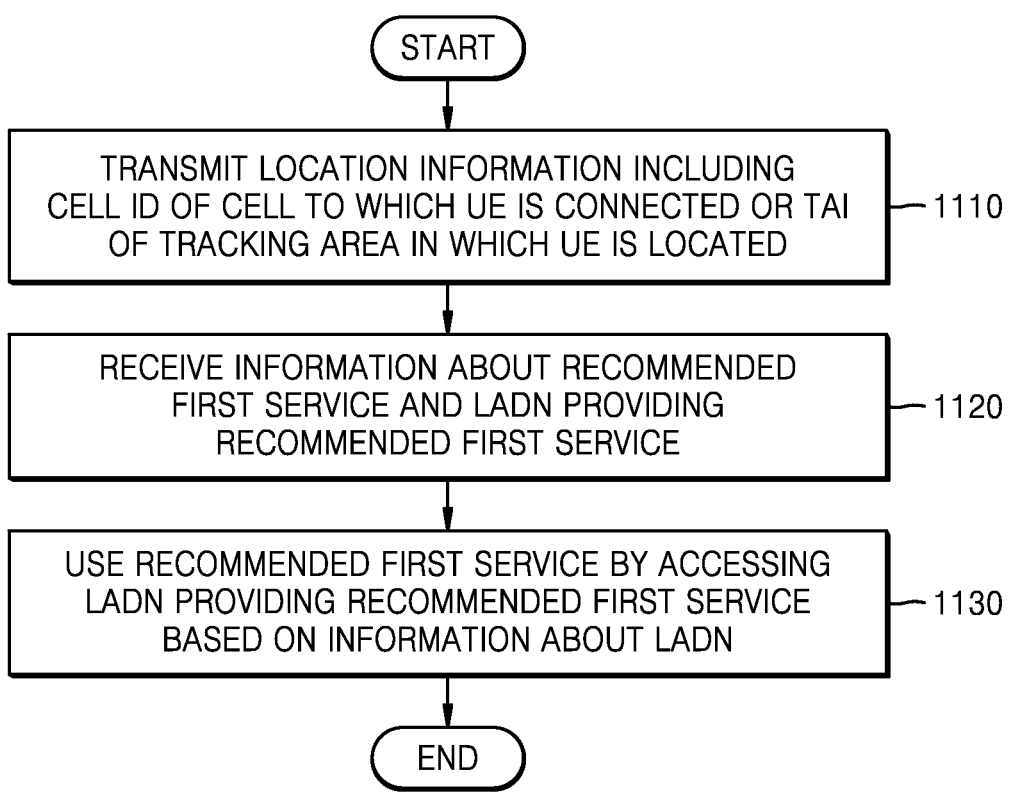
FIG. 11 is a flowchart of an operation method of a UE according to an embodiment of the disclosure.

FIG. 11 is a flowchart of an operation method of a UE according to an embodiment of the disclosure.

Initially, in operation 1110, the UE may transmit, to at least one of a MEC server, a 5G core network device such as an AMF, or a SMF, location information including a cell ID of a cell to which the UE is connected or a TAI of a tracking area in which the UE is located. In an embodiment of the disclosure, the UE may further transmit, to the MEC server, UE information including, for example, a UE ID, a UE IP address, UE capability information, and preferred service information. The UE information may be transmitted before the location information is transmitted, together with the location information, or after the location information is transmitted.

Thereafter, in operation 1120, the UE may receive, from the MEC server, information associated with a recommended first service and a LADN capable of providing the recommended first service. In an embodiment of the disclosure, the UE may receive a DNN of the LADN and a service number from a MEC control server.

Then, in operation 1130, the UE may access the LADN capable of providing the recommended first service and use the recommended first service based on the information associated with the LADN. In an embodiment of the disclosure, the UE may perform PDU session authentication/authorization together with a 5G base station, an AMF or SMF corresponding to a 5G core network function, and the MEC server by transmitting a PDU session establishment request to the AMF or SMF based on the information associated with the LADN. Thereafter, the UE may perform AN-specific resource setup together with the 5G base station and use the recommended first service by receiving downlink data from and transmitting uplink data to the MEC server.

Furthermore, when the UE receives information associated with a recommended second service and a LADN capable of providing the recommended second service, from the MEC control server, the UE may terminate use of the recommended first service or transmit a recommendation request to the MEC control server. In an embodiment of the disclosure, the recommended first service and the recommended second service may be services provided by MEC servers located in different LADNs.

Figure 12:
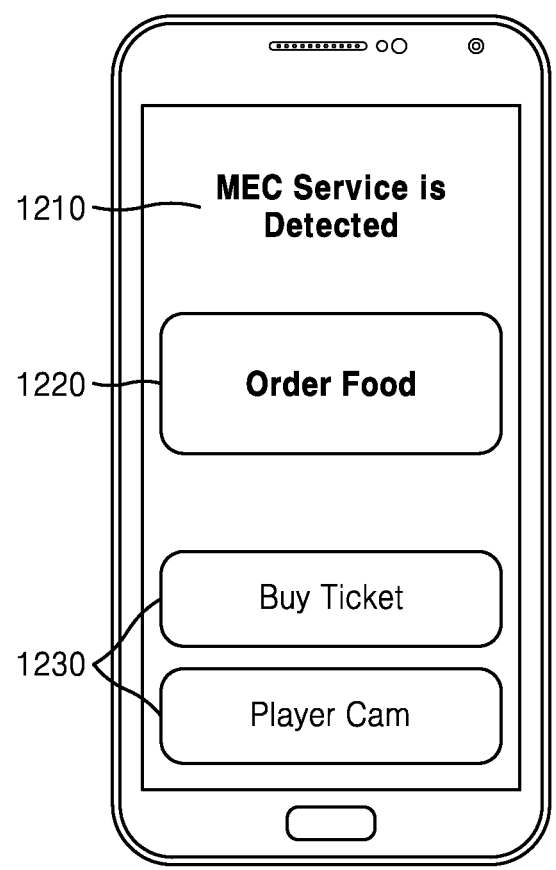
FIG. 12 is a diagram illustrating a user interface associated with a method of displaying a recommended service performed by a UE, according to an embodiment of the disclosure.

FIG. 12 is a diagram illustrating a user interface associated with a method of displaying a recommended service performed by a UE according to an embodiment of the disclosure.

When a MEC control server determines to recommend a service to the UE through a procedure corresponding to, for example, operation 620 or 640 of FIG. 6, the UE may receive a recommendation for a service from the MEC control server by merely entering coverage of a LADN. FIG. 12 shows an example of a screen image displayed through a user interface of the UE when the UE enters the coverage of the LADN and receives a recommendation for a service from the MEC control server. Specifically, FIG. 12 shows a screen image displayable on the UE in a procedure in which the UE receives services from one or more MEC servers in one LADN as described above in relation to FIG. 2.

In an embodiment of the disclosure, when the UE has entered the coverage of the LADN, the UE may receive, from the MEC control server, a recommendation for a service appropriate for the UE. As described above in relation to FIG. 2, when cells near a stadium are set as one LADN 1100, the MEC servers 131 and 132 located in the LADN 1100 may provide services specialized for the stadium. For example, the MEC server 131 may provide a food ordering service at a food & beverage store in the stadium. For example, the MEC server 132 may provide a ticket buying service and a player cam service in relation to a sport game held at the stadium.

When the first UE 10 has entered the coverage of the LADN 1100 configured as the cells near the stadium, a notification indicating that MEC services are providable, e.g., 'MEC Service is Detected' 1210, may be displayed on a screen. In an embodiment of the disclosure, such a notification may be displayed as text or various other visual expressions such as a preset image, an identification symbol, and light-emitting diode (LED) flickers. In addition to the visual expressions, the notification may be output as auditory expressions such as notification sound or music, or be output in other forms such as vibration, to notify a user that MEC services are providable.

In an embodiment of the disclosure, in addition to the notification indicating that services are providable, a recommended service and a list of other services providable to the first UE 10 may be displayed on the first UE 10. In this case, the MEC control server 140 may recommend a service appropriate for the first UE 10. For example, when the first UE 10 has entered the coverage of the LADN 1100 at lunch time, the MEC control server 140 may recommend the food ordering service of the MEC server 131 to the first UE 10. In this case, as illustrated in FIG. 12, an 'Order Food' service 1220 may be displayed as the recommended service and 'Buy Ticket' and 'Player Cam' services 1230 may be displayed as the other services providable to the first UE 10. In an embodiment of the disclosure, the recommended service and the other services providable to the first UE 10 may be displayed to be visually different. For example, the recommended service may be displayed in bold type and the other services providable to the first UE 10 may be displayed in light type. However, the disclosure is not limited thereto and the recommended service and the other services providable to the first UE 10 may be differently displayed in various methods.

In an embodiment of the disclosure, a user of the first UE 10 may select and use the recommended service displayed on the first UE 10, or select and use the other services providable to the first UE 10. Alternatively, the first UE 10 may be set to automatically execute an application or operation related to a service when the service is recommended.

Figure 13:
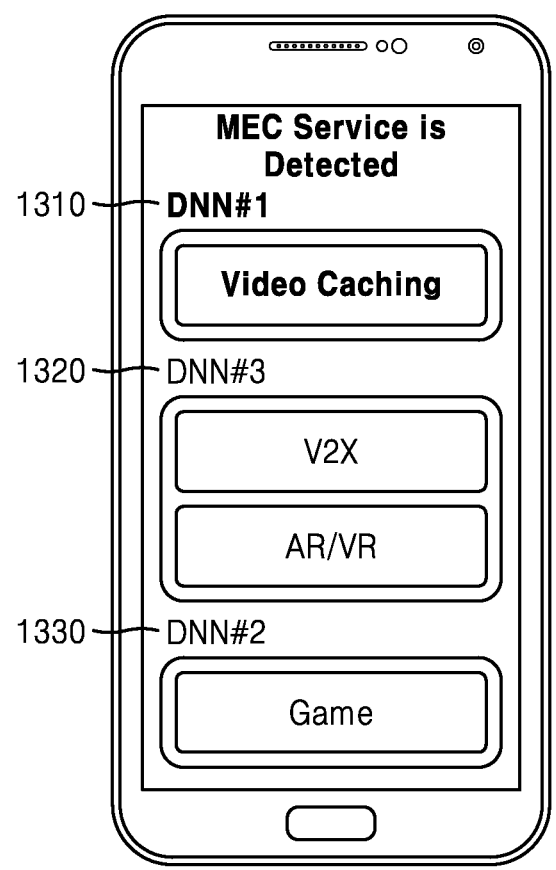
FIG. 13 is a diagram illustrating a method of displaying a recommended service performed by a UE according to another embodiment of the disclosure.

FIG. 13 is a diagram illustrating a user interface associated with a method of displaying a recommended service performed by a UE according to an embodiment of the disclosure.

Unlike FIG. 12, FIG. 13 shows a screen image displayable in a user interface on the UE in a procedure in which the UE receives services from one of a plurality of LADNs when the UE is accessible to the plurality of LADNs as described above in relation to FIG. 3.

In an embodiment of the disclosure, when the UE has entered coverages of the plurality of LADNs, the UE may receive, from a MEC control server, a recommendation for a service appropriate for the UE from among services capable of being provided by MEC servers located in the plurality of LADNs. As described above in relation to FIG. 3, when the UE 30 is accessible to a plurality of LADNs 1101, 1102, and 1103, the first UE 10 may receive different services from the LADNs 1101, 1102, and 1103. For example, the MEC server 131 located in the LADN 1101 may provide a video caching service, the MEC servers 132-1 and 132-2 located in the LADN 1102 may provide AR, VR, and V2X services, and the MEC server 133 located in the LADN 1103 may provide a computer game service. In this case, when the LADNs 1101, 1102, and 1103 are respectively set to be connectable through the different base stations 111, 112, and 113, the UE 30 is connectable to only one base station and thus may receive a service from one LADN at a time. However, the disclosure is not limited thereto and, when the UE 30 is connectable through one base station to a plurality of LADNs, the UE 30 may receive services through the base station from different LADNs at the same time.

In an embodiment of the disclosure, when the UE 30 has entered coverages of the plurality of the LADNs 1101, 1102, and 1103, a notification indicating that MEC services are providable may be displayed on a screen as illustrated in FIG. 13. In addition to the notification indicating that services are providable, a recommended service and a list of other services providable to the UE 30 may be displayed on the UE 30. For example, when the UE 30 is displaying a high-resolution video such as a movie, the video caching service providable by the MEC server 131 located in the LADN 1101 may be recommended. In this case, a 'Video Caching' service may be displayed as the recommended service and information associated with a LADN capable of providing the 'Video Caching' service, e.g., 'DNN #1' 1310, may also be displayed. That is, unlike FIG. 12 showing a screen image displayable on the first UE 10 in a procedure of receiving services from one or more MEC servers in one LADN, in FIG. 13 showing a screen image displayable on the UE 30 in a procedure of receiving services from one of a plurality of LADNs, when the recommended service and the list of the other services providable to the UE 30 are displayed, the providable services may be displayed per LADN. For example, 'DNN #3' 1320 may be displayed together with 'V2X' and 'AR/VR' services, and 'DNN #2' 1330 may be displayed together with a 'Game' service.

In an embodiment of the disclosure, the recommended service, the information associated with the LADN capable of providing the recommended service, the other services providable to the UE 30, and the information associated with the LADNs providing the other services may be displayed visually different.

In an embodiment of the disclosure, a user of the UE 30 may select and use the recommended service displayed on the UE 30, or select and use the other services providable to the UE 30. Alternatively, the UE 30 may be set to automatically execute an application or operation related to a service when the service is recommended.

In an embodiment of the disclosure, after use of the recommended service is terminated, the UE 30 may change the connected LADN by receiving a recommendation for and selecting a service provided by a LADN other than the LADN capable of providing the recommended service. Alternatively, while the recommended service is being used, the user may change the connected LADN by selecting a service provided by a LADN other than the LADN capable of providing the recommended service.

Figure 14:
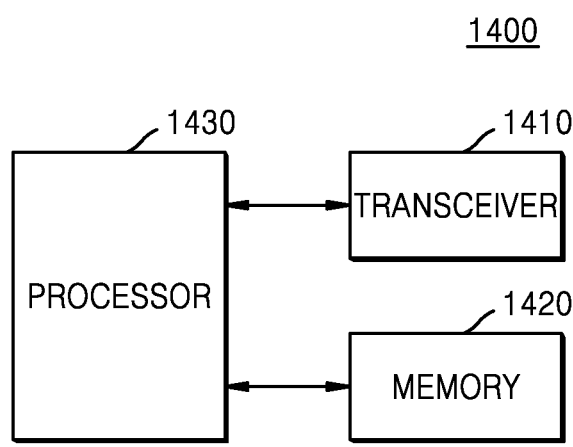
FIG. 14 is a block diagram of a MEC control server according to an embodiment of the disclosure.

FIG. 14 is a block diagram of a MEC control server 1400 according to an embodiment of the disclosure.

As illustrated in FIG. 14, the MEC control server 1400 according to an embodiment of the disclosure may include a transceiver 1410, a memory 1420, and a processor 1430. However, elements of the MEC control server 1400 are not limited to the above-mentioned examples. For example, the MEC control server 1400 may include a larger or smaller number of elements compared to the above-mentioned elements. In an exemplary embodiment, the transceiver 1410, the memory 1420, and the processor 1430 may be configured as a single chip.

The transceiver 1410 may be configured to transmit and receive signals to and from an external device. The signals transmitted to and received from the external device may include control information and data. In this case, the external device may include, for example, a UE, a 5G base station, a 5G core network, or a MEC server. The transceiver 1410 may include, for example, a radio frequency (RF) transmitter for up-converting a frequency of and amplifying a signal to be transmitted, and a RF receiver for low-noise-amplifying and down-converting a frequency of a received signal. However, the above-mentioned elements are merely examples and elements of the transceiver 1410 are not limited to the RF transmitter and the RF receiver. The transceiver 1410 may receive a signal through a wireless channel and provide the signal to the processor 1430, and may transmit a signal output from the processor 1430, through the wireless channel.

The memory 1420 may store a program and data required for operation of the MEC control server 1400. In an embodiment of the disclosure, the memory 1420 may store the control information or data included in the signals transmitted or received by the MEC control server 1400. The memory 1420 may include any or a combination of storage media such as read-only memory (ROM), random access memory (RAM), a hard disk, a compact disc (CD)-ROM, a digital versatile disc (DVD), or other non-transitory recording medium. A plurality of memories 1420 may be included. According to an embodiment of the disclosure, the memory 1420 may store a program for performing the operation for service recommendation according to the afore-described embodiments of the disclosure.

The processor 1430 may control a series of procedures performed by the MEC control server 1400 according to the afore-described embodiments of the disclosure. For example, the processor 1430 may control the elements of the MEC control server 1400 to perform the operation of the MEC control server 1400 according to an embodiment of the disclosure. A plurality of processors 1430 may be included. The processor 1430 may perform the operation of the MEC control server 1400 by executing the program stored in the memory 1420.

In an embodiment of the disclosure, the processor 1430 may receive, from at least one of a UE, a 5G core network device such as an AMF, or a SMF, location information including a cell ID of a cell to which the UE is connected or a TAI of a tracking area in which the UE is located, determine at least one LADN accessible by the UE, based on the location information, determine a first service to be recommended to the UE from among services providable to the UE through the at least one LADN, and transmit information associated with the recommended first service and a LADN capable of providing the recommended first service to the UE. The processor 1430 may receive, from the UE, UE information including at least one of a UE ID, a UE IP address, UE capability information, or preferred service information, and determine the first service to be recommended based on the UE information.

In an embodiment of the disclosure, the processor 1430 may determine a second service to be recommended based on a UE behavior pattern including at least one of a service usage pattern or a movement pattern of the UE after the recommended first service is terminated or upon a request of the UE, and transmit, to the UE, information associated with the recommended second service and a LADN capable of providing the recommended second service. In this case, the recommended first service and the recommended second service may be provided through different LADNs.

In an embodiment of the disclosure, the processor 1430 may update the UE behavior pattern after the recommended first service is terminated.

Figure 15:
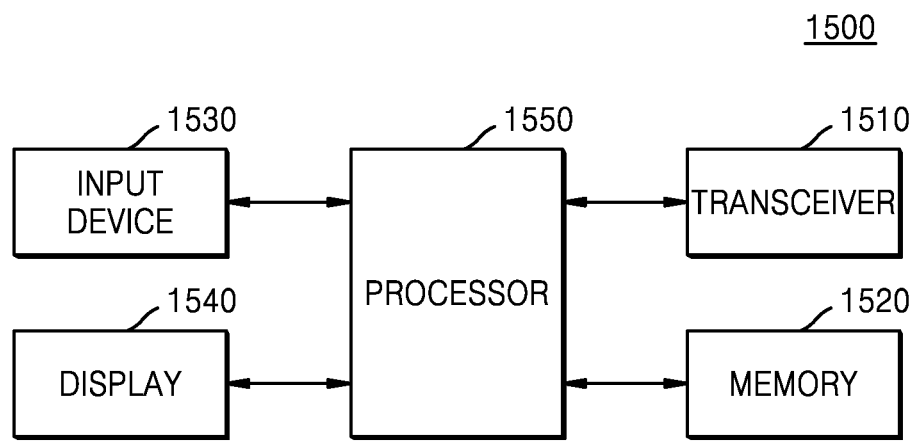
FIG. 15 is a block diagram of a UE according to an embodiment of the disclosure.

FIG. 15 is a block diagram of a UE 1500 according to an embodiment of the disclosure.

As illustrated in FIG. 15, the UE 1500 according to an embodiment of the disclosure may include a transceiver 1510, a memory 1520, an input device 1530, a display 1540, and a processor 1550. However, elements of the UE 1500 are not limited to the above-mentioned examples. For example, the UE 1500 may include a larger or smaller number of elements compared to the above-mentioned elements. In an exemplary embodiment, the transceiver 1510, the memory 1520, and the processor 1550 may be configured as a single chip.

The transceiver 1510 may be configured to transmit and receive signals to and from an external device. The signals transmitted to and received from the external device may include control information and data. In this case, the external device may include, for example, a 5G base station, a MEC control server, or a MEC server. The transceiver 1510 may include, for example, a RF transmitter for up-converting a frequency of and amplifying a signal to be transmitted, and a RF receiver for low-noise-amplifying and down-converting a frequency of a received signal. However, the above-mentioned elements are merely examples and elements of the transceiver 1510 are not limited to the RF transmitter and the RF receiver. The transceiver 1510 may receive a signal through a wireless channel and provide the signal to the processor 1550, and may transmit a signal output from the processor 1550, through the wireless channel.

The memory 1520 may store a program and data required for operation of the UE 1500. In an embodiment of the disclosure, the memory 1520 may store the control information or data included in the signals transmitted or received by the UE 1500. The memory 1520 may include any or a combination of storage media such as ROM, RAM, a hard disk, a CD-ROM, a DVD, or other non-transitory recording medium. A plurality of memories 1520 may be included. According to an embodiment of the disclosure, the memory 1520 may store a program for performing the operation for service recommendation according to the afore-described embodiments of the disclosure.

The input device 1530 may receive inputs from a user. The input device 1530 may include devices capable of receiving various types of user inputs, e.g., a keyboard, physical buttons, a touchscreen, a camera, and a microphone. However, the disclosure is not limited thereto and the input device 1530 may include devices supporting various inputs. In an embodiment of the disclosure, the input device 1530 may receive, from the user, an input for selecting a service.

The display 1540 may display information such as an operation result of the UE 1500 or a status of the UE 1500. The display 1540 may include, for example, a liquid crystal display (LCD), a thin film transistor-liquid crystal display (TFT-LCD), an organic light-emitting diode (OLED), a flexible display, a three-dimensional (3D) display, or an electrophoretic display. The UE 1500 may include two or more displays 1540 depending on configuration of the UE 1500.

The processor 1550 may control a series of procedures performed by the UE 1500 according to the afore-described embodiments of the disclosure. For example, the processor 1550 may control the elements of the UE 1500 to perform the operation of the UE 1500 according to an embodiment of the disclosure. A plurality of processors 1550 may be included. The processor 1550 may perform the operation of the UE 1500 by executing the program stored in the memory 1520.

In an embodiment of the disclosure, the processor 1550 may transmit, to at least one of a MEC control server, a 5B core network device such as an AMF, or a SMF, location information including a cell ID of a cell to which the UE 1500 is connected or a TAI of a tracking area in which the UE 1500 is located, receive, from the MEC control server, information associated with a recommended first service and a LADN capable of providing the recommended first service, and use the recommended first service by accessing the LADN capable of providing the recommended first service based on the information associated with the LADN. The processor 1550 may transmit, to the MEC control server, UE information including at least one of a UE ID, a UE IP address, UE capability information, or preferred service information.

In an embodiment of the disclosure, the processor 1550 may receive, from the MEC control server, information associated with a recommended second service and a LADN capable of providing the recommended second service after the recommended first service is terminated or by transmitting a recommendation request to the MEC control server, and use the recommended second service by accessing the LADN capable of providing the recommended second service based on the information associated with the LADN. In this case, the recommended first service and the recommended second service may be provided through different LADNs.

The methods according to various embodiments of the disclosure as described herein or in the following claims may be implemented as hardware, software, or a combination of hardware and software.

When implemented as software, a computer-readable storage medium or computer program product storing one or more programs (e.g., software modules) may be provided. The one or more programs stored in the computer-readable storage medium or computer program product may be configured for execution by one or more processors in an electronic device. The one or more programs may include instructions directing the electronic device to perform the methods according to various embodiments of the disclosure as described herein or in the following claims.

The programs (e.g., software modules or software) may be stored in non-volatile memory including RAM or flash memory, read only memory (ROM), electrically erasable programmable read only memory (EEPROM), a magnetic disc storage device, a CD-ROM, a DVD, another optical storage device, a magnetic cassette, or other non-transitory recording medium. Alternatively, the programs may be stored in memory including a combination of some or all of the above-mentioned storage media. A plurality of such memories may be included.

In addition, the programs may be stored in an attachable storage device accessible through any or a combination of communication networks such as the Internet, an intranet, a local area network (LAN), a wide LAN (WLAN), and a storage area network (SAN). Such a storage device may access the electronic device via an external port. Furthermore, an additional storage device on the communication network may access the electronic device.

In the afore-described embodiments of the disclosure, an element or elements included in the disclosure are expressed in a singular form or plural form depending on the described embodiments of the disclosure. However, the singular form or plural form is selected appropriately for a situation assumed for convenience of description and the disclosure is not limited to the singular or plural form. An element expressed in a singular form may include a plurality of elements, and elements expressed in a plural form may include a single element.

The embodiments of the disclosure may be combined as necessary. For example, a part of an embodiment of the disclosure may be combined with a part of another embodiment of the disclosure. The embodiments of the disclosure may be applied to other systems, e.g., an LTE system and a 5G or NR system, through modification without departing from the scope as defined by the following claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An operation method of a mobile edge computing (MEC) control server, the operation method comprising:
    receiving, at the MEC control server, from at least one of a user equipment (UE), an access and mobility management function (AMF) device, or a session management function (SMF) device, location information comprising a cell identity (ID) of a cell to which the UE is connected or a tracking area identity (TAI) of a tracking area in which the UE is located;
    determining, by the MEC control server, at least one local area data network (LADN) accessible by the UE based on the cell ID of the cell to which the UE is connected or the TAI of the tracking area in which the UE is located;
    determining a first service to be recommended to the UE from among services providable to the UE by at least one MEC server located in the at least one LADN; and
    transmitting, to the UE, information associated with the recommended first service and a LADN capable of providing the recommended first service,
    wherein the MEC control server controls service providing procedure in the LADN by using the MEC server.

2. The method of claim 1, further comprising:
    receiving, from the UE, UE information comprising at least one of a UE ID, a UE Internet protocol (IP) address, UE capability information, or preferred service information,
    wherein the determining of the first service to be recommended to the UE comprises determining the first service to be recommended based on at least one of the UE information or a UE behavior pattern comprising at least one of a service usage pattern or a movement pattern of the UE.

3. The method of claim 2, further comprising:
    determining a second service to be recommended based on at least one of the UE information or the UE behavior pattern after the recommended first service is terminated or upon a request of the UE; and
    transmitting, to the UE, information associated with the recommended second service and a LADN capable of providing the recommended second service.

4. The method of claim 3, wherein the recommended first service and the recommended second service are provided through different LADNs.

5. The method of claim 3, further comprising updating the UE behavior pattern after the recommended first service is terminated.

6. An operation method of a user equipment (UE), the operation method comprising:
    transmitting, to at least one of a mobile edge computing (MEC) control server, an access and mobility management function (AMF) device, or a session management function (SMF) device, location information comprising a cell identity (ID) of a cell to which the UE is connected or a tracking area identity (TAI) of a tracking area in which the UE is located;
    receiving, from the MEC control server, information associated with a recommended first service and a local area data network (LADN) capable of providing the recommended first service; and
    using the recommended first service by accessing at least one MEC server located in the LADN capable of providing the recommended first service based on the information associated with the LADN,
    wherein the MEC control server controls service providing procedure in the LADN by using the MEC server, and
    wherein the MEC control server determines the LADN capable of providing the recommended first service based on the cell ID of the cell to which the UE is connected or the TAI of the tracking area in which the UE is located.

7. The method of claim 6, further comprising transmitting, to the MEC control server, UE information comprising at least one of a UE ID, a UE Internet protocol (IP) address, UE capability information, or preferred service information.

8. The operation method of claim 6, further comprising:
    receiving, from the MEC control server, information associated with a recommended second service and a LADN capable of providing the recommended second service after the recommended first service is terminated or by transmitting a recommendation request to the MEC control server; and
    using the recommended second service by accessing the LADN capable of providing the recommended second service based on the information associated with the LADN.

9. The method of claim 8, wherein the recommended first service and the recommended second service are provided through different LADNs.

10. A mobile edge computing (MEC) control server comprising:
    a transceiver;
    a memory storing a program and data required for service recommendation; and
    at least one processor configured to execute the program stored in the memory to:
        receive, from at least one of a user equipment (UE), an access and mobility management function (AMF) device, or a session management function (SMF) device via the transceiver, location information comprising a cell identity (ID) of a cell to which the UE is connected or a tracking area identity (TAI) of a tracking area in which the UE is located, determine at least one local area data network (LADN) accessible by the UE based on the cell ID of the cell to which the UE is connected or the TAI of the tracking area in which the UE is located, determine a first service to be recommended to the UE from among services providable to the UE by at least one MEC server located in the at least one LADN, and transmit, to the UE, information associated with the recommended first service and a LADN capable of providing the recommended first service, wherein the MEC control server controls service providing procedure in the LADN by using the MEC server.

11. The MEC control server of claim 10, wherein the at least one processor is further configured to:

receive, from the UE, UE information comprising at least one of a UE ID, a UE Internet protocol (IP) address, UE capability information, or preferred service information, and determine the first service to be recommended based on at least one of the UE information or a UE behavior pattern comprising at least one of a service usage pattern or a movement pattern of the UE.

12. The MEC control server of claim 11, wherein the at least one processor is further configured to:

determine a second service to be recommended based on at least one of the UE information or the UE behavior pattern after the recommended first service is terminated or upon a request of the UE, and transmit, to the UE, information associated with the recommended second service and a LADN capable of providing the recommended second service.

13. The MEC control server of claim 12, wherein the recommended first service and the recommended second service are provided through different LADNs.

14. The MEC control server of claim 12, wherein the at least one processor is further configured to update the UE behavior pattern after the recommended first service is terminated.

15. A user equipment (UE) comprising:

a transceiver;

a memory storing a program and data required for service recommendation; and at least one processor configured to execute the program stored in the memory to:

transmit, to at least one of a mobile edge computing (MEC) control server, an access and mobility management function (AMF) device, or a session management function (SMF) device, location information comprising a cell identity (ID) of a cell to which the UE is connected or a tracking area identity (TAI) of a tracking area in which the UE is located, receive, from the MEC control server, information associated with a recommended first service and a local area data network (LADN) capable of providing the recommended first service, and use the recommended first service by accessing at least one MEC server located in the LADN capable of providing the recommended first service based on the information associated with the LADN, wherein the MEC control server controls service providing procedure in the LADN by using the MEC server, and wherein the MEC control server determines the LADN capable of providing the recommended first service based on the cell ID of the cell to which the UE is connected or the TAI of the tracking area in which the UE is located.

16. The UE of claim 15, wherein the at least one processor is further configured to transmit, to the MEC control server, UE information comprising at least one of a UE ID, a UE Internet protocol (IP) address, UE capability information, or preferred service information.

17. The UE of claim 15, wherein the at least one processor is further configured to:

receive, from the MEC control server, information associated with a recommended second service and a LADN capable of providing the recommended second service after the recommended first service is terminated or by transmitting a recommendation request to the MEC control server, and use the recommended second service by accessing the LADN capable of providing the recommended second service based on the information associated with the LADN.

18. The UE of claim 17, wherein the recommended first service and the recommended second service are provided through different LADNs.

19. The method of claim 1, wherein the determining of the first service to be recommended to the UE from among services providable to the UE through the at least one LADN is based on a time in which the location information is received or information stored at the MEC control server.

20. The method of claim 6, further comprising:

transmitting, to the AMF device or the SMF device, a request to access the LADN to use the recommended first service; and receiving, from a base station, a response to the request to access the LADN to use the recommended first service.

* * * * *